(12) United States Patent
Thanvantri Vasudevan et al.

(10) Patent No.: US 12,541,545 B1
(45) Date of Patent: Feb. 3, 2026

(54) GENERATION OF BENCHMARKING DATASETS FOR SUMMARIZATION

(71) Applicant: DocuSign, Inc., San Francisco, CA (US)

(72) Inventors: Vishal Thanvantri Vasudevan, Lynnwood, WA (US); Mohammadhossein Basi, Irvine, CA (US); Ramachandra Kota, Mountain View, CA (US); Kristina Lee Murphy, Phoenix, AZ (US)

(73) Assignee: Docusign, Inc., San Francisco, CA (US)

( * ) Notice: Subject to any disclaimer, the term of this patent is extended or adjusted under 35 U.S.C. 154(b) by 0 days.

(21) Appl. No.: 18/397,068

(22) Filed: Dec. 27, 2023

(51) Int. Cl.
*G06F 16/34* (2025.01)
*G06F 16/338* (2019.01)
*G06F 16/383* (2019.01)
*G06F 40/40* (2020.01)

(52) U.S. Cl.
CPC .......... *G06F 16/338* (2019.01); *G06F 16/345* (2019.01); *G06F 16/383* (2019.01); *G06F 40/40* (2020.01)

(58) Field of Classification Search
CPC ..... G06F 16/338; G06F 16/345; G06F 16/383
See application file for complete search history.

(56) References Cited

U.S. PATENT DOCUMENTS

2009/0012926 A1 1/2009 Ishikawa et al.
2014/0195897 A1* 7/2014 Balinsky ............... G06F 40/106
715/254
2019/0325066 A1* 10/2019 Krishna ............... G06F 16/3347
2020/0382677 A1 12/2020 Chen
2020/0394567 A1 12/2020 Choe
2021/0375291 A1* 12/2021 Zeng ..................... H04L 67/306
2022/0237373 A1* 7/2022 Singh Bawa ........... G06F 40/20
2023/0101817 A1 3/2023 Sinha
2023/0368043 A1 11/2023 Macklin
2024/0111397 A1 4/2024 Kuang et al.
2024/0135096 A1 4/2024 Jain

OTHER PUBLICATIONS

Chan, et al., "BERT for Question Generation, International Conference on Natural Language Generation", 2019 (Year: 2019).
Lee, et al., "Generating Queries from User-Selected Text", ACM 2012, Year: 2012.
Park, et al., "Reducing Redundancy in Keyword Query Processing on Graph Databases", Journal of Information Science and Engineering, 2018. (Year: 2018).

\* cited by examiner

*Primary Examiner* — Robert W Beausoliel, Jr.
*Assistant Examiner* — Nirav K Khakhar
(74) *Attorney, Agent, or Firm* — KDW FIRM PLLC

(57) ABSTRACT

A method, a system, and a computer program product for generating a benchmarking dataset. One or more queries for generation of one or more summaries of one or more electronic documents are received. The queries are modified using one or more parameters associated with the electronic documents to generate modified queries. The electronic documents are sent to a generative artificial intelligence (AI) model. The generative AI model generates summaries of the electronic documents based on at least one of: the initial queries and the modified queries. One or more labels for the electronic documents are generated using the summaries.

20 Claims, 21 Drawing Sheets

GENERATION OF BENCHMARKING DATASETS FOR SUMMARIZATION

BACKGROUND

Document management platforms are typically tasked with managing a growing collection of electronic documents. This may involve making the documents readable (e.g., through optical character recognition), parsing the documents and determining subject matter and/or content of documents. Electronic documents can include, for example, legal agreements, publicly available documents, such as, documents filed with governmental agencies, and/or any other documents. Analysis of documents or portions thereof is a difficult and compute-intensive operation, especially when large documents are involved. Large language models are used to process such documents to generate summaries of documents, summaries of certain portions of documents, etc. However, some existing large language models are ineffective in properly analyzing the documents, and existing document management platforms do not have mechanism to assess effectiveness of such models, which can lead to results that are inaccurate or worse, incorrect.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Figure 1:
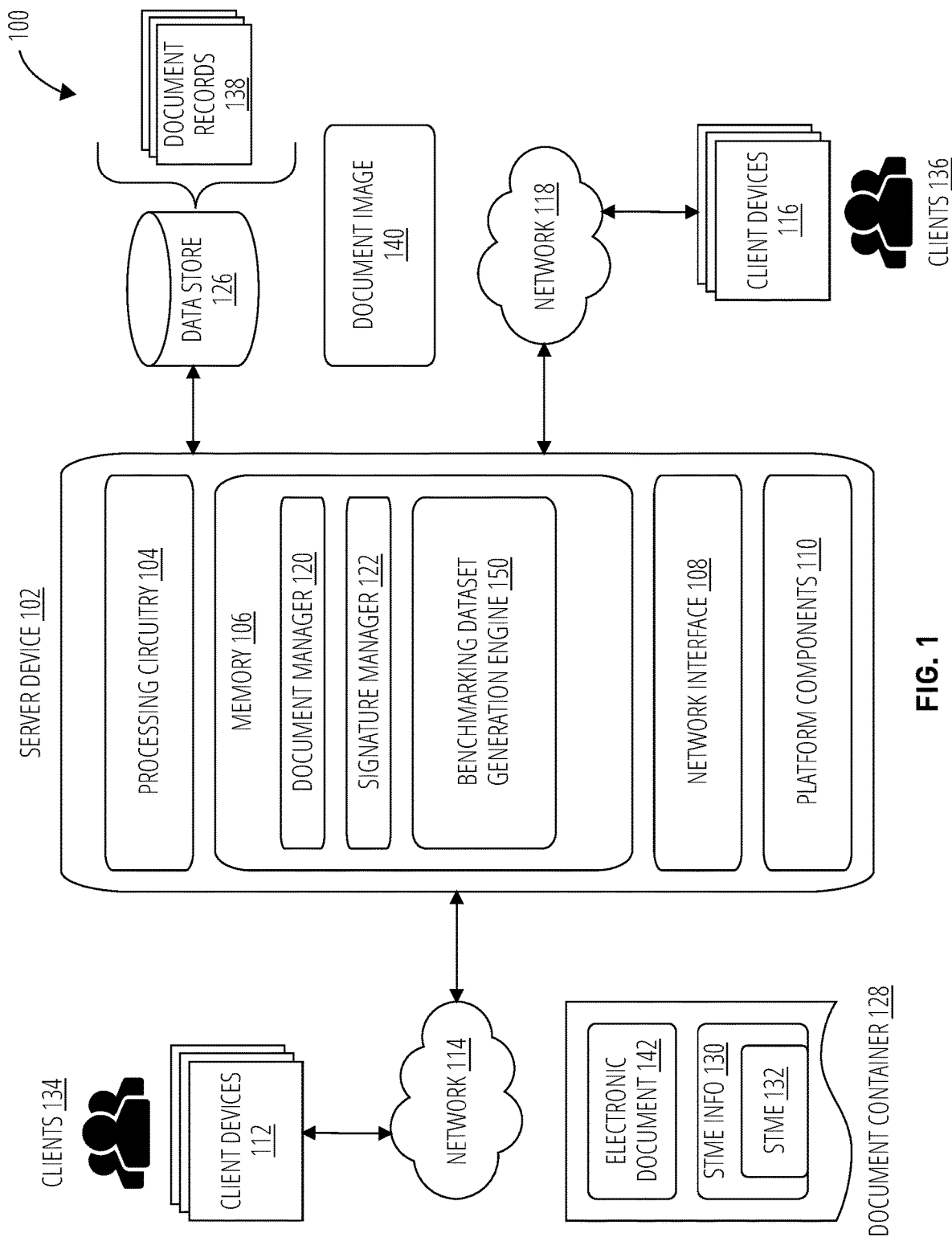
FIG. 1 illustrates a system in accordance with one embodiment.

Embodiments disclosed herein are generally directed to techniques for processing of documents and/or various summaries of such documents using a graphical user interface, where such document processing is assisted through use of machine learning models and artificial intelligence architectures. In some example embodiments, the current subject matter relates to an ability to generate one or more datasets, through use of various document summarization techniques, that may be used for evaluation of large language models.

In general, a document may include a multimedia record. The term "electronic" may refer to technology having electrical, digital, magnetic, wireless, optical, electromagnetic, or similar capabilities. The term "electronic document" may refer to any electronic multimedia content intended to be used in an electronic form. An electronic document may be part of an electronic record. The term "electronic record" may refer to a contract or other record created, generated, sent, communicated, received, or stored by an electronic mechanism. An electronic document may have an electronic signature. The term "electronic signature" may refer to an electronic sound, symbol, or process, attached to or logically associated with an electronic document, such as a contract or other record, and executed or adopted by a person with the intent to sign the record.

An online electronic document management system provides a host of different benefits to users (e.g., a client or customer) of the system. One advantage is added convenience in generating and signing an electronic document, such as a legally binding agreement. Parties to an agreement can review, revise and sign the agreement from anywhere around the world on a multitude of electronic devices, such as computers, tablets and smartphones.

In some embodiments, the current subject matter may be configured to provide an ability to generate a dataset (e.g., a benchmarking dataset) that may be used to analyze and/or assess effectiveness of a large language model. In some example embodiments, the generated dataset may be used to train such large language model. For instance, the dataset may be used to train the model so that it may be used to respond to specific queries (e.g., document summarization, extraction of specific clauses of an agreement and summarizing them, identifying contractual obligations, etc.).

Generation of a dataset may be based on labeled and/or unlabeled electronic documents (e.g., documents stored in electronic format, e.g., .docx, .pdf, html, etc.) that may be obtained from one or more storage locations. Labeled documents may be documents that may have been previously analyzed (either manually and/or using a machine learning model) and labeled. For example, to label a lease agreement, the agreement may be parsed into specific clauses, paragraphs, sentences, words, etc. and/or any other portions (such as, for example, through use of optical character recognition, etc.). Upon analysis of these portions (such as, for example, through natural language processing, and/or any other mechanisms), various labels, identifiers, metadata, and/or any other identification may be assigned to the portions indicating content of each specific portion (e.g., "termination label" may be assigned to a termination clause of the lease agreement, etc.). Alternatively, or in addition, the labels may identify the entire document, any summary/ies of the document and/or any of its portions. The labels may be stored together with the documents in a storage location. The labels may be stored in any desired fashion.

Unlabeled document may be documents that may be stored in any public and/or private storage locations, databases, etc. For example, the documents may be stored in one or more government databases (e.g., SEC-EDGAR, etc.), non-governmental databases, third party publicly accessible databases, member-access based databases, etc. The unlabeled documents may or may not have been parsed, analyzed, etc. The documents in such storage locations may or may not include identification information that may identify the document and/or any portions thereof.

One or more of such labeled and/or unlabeled electronic documents may be provided to a generative artificial intelligence (AI) model for processing. The generative AI model(s) may be part of the current subject matter system and/or be one or more third party models (e.g., ChatGPT, Bard, DALL-E, Midjourney, DeepMind, etc.). The generative AI model(s) may be configured to generate one or more summaries based on the provided electronic documents.

The summaries may be generated based on receiving one or more queries requesting summaries of an electronic document. For example, a query may be formulated so as to request a summary of a entirety of a lease agreement and/or specific provisions thereof (e.g., term, termination, jurisdiction, etc.). The queries may be modified using one or more parameters or attributes associated with the electronic document. The parameters may include at least one of the following: a type of the electronic document (e.g., a sales agreement, a lease agreement, etc.), a length of the electronic document and/or any portions of the electronic document, entities or parties that may be involved and/or associated with the electronic document (e.g., specific companies, individuals, etc.), a time associated with the electronic document (e.g., a lease agreement executed in 2023, a sales agreement executed in 2015, etc.), a specific geographical location associated with the document (e.g., a lease agreement executed in the state of California, a sales agreement executed in the state of New York, etc.), and/or any other parameters, and/or any combinations thereof. Using the parameters of the electronic document, the current subject matter may be configured to modify the queries and generate one or more modified queries for sending to the generative AI model(s).

The generative AI model(s), upon receiving the queries and/or modified queries, may be configured to generate one or more summaries of the electronic document and/or any portions thereof. The content of the summaries may be dependent on specific instructions for summaries contained in the queries and/or modified queries. The summaries may then be used to generate one or more labels for the electronic document and/or other electronic documents. The labels may include, for instance, one or more sentences, one or more words, one or more phrases, one or more alphanumeric characters, etc. and/or any combinations thereof that may be extracted from the generated summaries. Alternatively, or in addition, the labels may be entire document summaries. The labels may eventually be used to form a benchmarking dataset for evaluating how effective one or more large language models are at generating summaries of electronic documents.

The labels may also be validated through subject matter analysis, e.g., whether the label (e.g., sentence, word, phrase, etc.) is related to the summary. Labels may be discarded if they do not correspond to the summary's subject matter (e.g., a label indicating a termination provision of a lease agreement is provided in response to a summary summarizing governing law provision of the agreement, which is non-responsive). If the labels correspond to the subject matter of the query (e.g., a label indicating termination period of the lease agreement corresponds to a summary of the termination provisions of the agreement indicating that the "term is one year") may be considered as validated labels and stored as such.

In some embodiments, to analyze labels, one or more rules or guidelines may be generated. The rules may rely on various methodologies for analyzing relevance of labels. For example, a precision-and-recall methodology, a normalized discounted cumulative gain (NDCG) methodology, and/or any other methodology may be used. The validated labels may form a benchmarking dataset, which, in turn, may be used to assess or evaluate effectiveness of machine learning models, such as, for example, large language models, generative AI models, etc., at summarizing electronic documents.

In some embodiments, for evaluation of large language models, a ground truth machine learning model may be identified and trained using the benchmarking dataset and/or any other dataset. The model may be selected from a plurality of machine learning models and trained using the dataset so that a ground truth summary of one or more electronic documents may be generated. Once the ground truth machine learning model and ground truth summaries are identified/generated, another machine learning model (e.g., a large language model, a generative AI model, etc.) may be selected and requested to generate a summary of an electronic document. The generated summary may be compared to the ground truth summary. Comparison of the two summaries may be evaluated to determine whether the selected machine learning model is acceptable for generating summaries of electronic documents. Comparison may involve generation of at least one of: one or more scores ranking the comparing, one or more metrics indicating similarity of the generated summary and the ground truth summary, and any combinations thereof. The scores may include at least one of the following: a recall-oriented understudy for gisting evaluation (ROUGE) score, a bilingual evaluation understudy score, and any combinations thereof. The similarity between summaries may be based on at least one of: exact match between the generated summary and the ground truth summary, similarities between one or more sentences in the generated summary and the ground truth summary, similarities between one or more phrases in the generated summary and the ground truth summary, similarities between one or more words in the generated summary and the ground truth summary, similarities between one or more alpha-numeric characters in the generated summary and the ground truth summary, and any combinations thereof.

One of the technical benefits of the current subject matter is that it provides for a dynamic generation of benchmarking datasets that may be used to analyze and/or train large language models for effectively and efficiently processing of large electronic documents that may be retrieved from data sources that are not well-organized or at all. The processes disclosed herein generate more accurate document labels that may be validated and/or reviewed in accordance with specific rules. Use of such accurate/validated sets of labels allows for generation of a more refined training dataset ensuring that analysis and/or training of large language models using it will be more precise, thereby enabling more accurate outcomes when such trained large language models are used to process large electronic documents. Further, use of the labels generated in accordance with the processes disclosed herein to assess large language models substantially reduces use of compute resources that may typically be consumed by generative AI models in performing of complete document analysis. Some conventional systems typically analyze an entire document to generate labels, which may often result in incomplete or even inaccurate labels (with omissions, errors, etc.), which cannot be used for analysis or training of large language models. Additionally, use of generative AI models to generate labels consumes a substantial amount of computing resources and takes a long time to complete, especially for large documents.

An additional technical benefit to the current subject matter is its ability to generate training datasets, not only expeditiously, but more accurately. The training datasets may be used for generation of ground truth summaries against which summaries generated by generative AI models may be compared and then scored to determine effectiveness of the generative AI models. This ensures that there are substantially fewer errors that may occur during generation as well as eventual analysis and validation of label sets, as a specific dataset has been accurately prepared. Existing systems lack an ability to refine the label-generation processes to such a higher degree and instead analyze and summarize full documents, which enhances possibilities of errors and mistakes.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application, or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising." Additionally, in situations wherein one or more numbered items are discussed (e.g., a "first X", a "second X", etc.), in general the one or more numbered items may be distinct, or they may be the same, although in some situations the context may indicate that they are distinct or that they are the same.

As used herein, the term "circuitry" may refer to, be part of, or include a circuit, an integrated circuit (IC), a monolithic IC, a discrete circuit, a hybrid integrated circuit (HIC), an Application Specific Integrated Circuit (ASIC), an electronic circuit, a logic circuit, a microcircuit, a hybrid circuit, a microchip, a chip, a chiplet, a chipset, a multi-chip module (MCM), a semiconductor die, a system on a chip (SoC), a processor (shared, dedicated, or group), a processor circuit, a processing circuit, or associated memory (shared, dedicated, or group) operably coupled to the circuitry that execute one or more software or firmware programs, a combinational logic circuit, or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

FIG. 1 illustrates an embodiment of a system 100. The system 100 may be suitable for implementing one or more embodiments as described herein. In one embodiment, for example, the system 100 may comprise an electronic document management platform (EDMP) suitable for managing a collection of electronic documents. An example of an EDMP includes a product or technology offered by DocuSign®, Inc., located in San Francisco, California ("DocuSign"). DocuSign is a company that provides electronic signature technology and digital transaction management services for facilitating electronic exchanges of contracts and signed documents. An example of a DocuSign product is a DocuSign Agreement Cloud that is a framework for generating, managing, signing and storing electronic documents on different devices. It may be appreciated that the system 100 may be implemented using other EDMP, technologies and products as well. For example, the system 100 may be implemented as an online signature system, online document creation and management system, an online workflow management system, a multi-party communication and interaction platform, a social networking system, a marketplace and financial transaction management system, a customer record management system, and other digital transaction management platforms. Embodiments are not limited in this context.

The system 100 may implement an EDMP as a cloud computing system. Cloud computing is a model for providing on-demand access to a shared pool of computing resources, such as servers, storage, applications, and services, over the Internet. Instead of maintaining their own physical servers and infrastructure, companies can rent or lease computing resources from a cloud service provider. In a cloud computing system, the computing resources are hosted in data centers, which are typically distributed across multiple geographic locations. These data centers are designed to provide high availability, scalability, and reliability, and are connected by a network infrastructure that allows users to access the resources they need. Some examples of cloud computing services include Infrastructure-as-a-Service (IaaS), Platform-as-a-Service (PaaS), and Software-as-a-Service (SaaS).

The system 100 may implement various search tools and algorithms designed to search for electronic document(s) and/or collections of electronic documents and/or information within an electronic document or across a collection of electronic documents. Within the context of a cloud computing system, the system 100 may implement a cloud search service accessible to users via a web interface or web portal front-end server system. A cloud search service is a managed service that allows developers and businesses to add search capabilities to their applications or websites without the need to build and maintain their own search infrastructure. Cloud search services typically provide powerful search capabilities, such as faceted search, full-text search, and auto-complete suggestions, while also offering features like scalability, availability, and reliability. A cloud search service typically operates in a distributed manner, with indexing and search nodes located across multiple data centers for high availability and faster query responses. These services typically offer application program interfaces (APIs) that allow developers to easily integrate search functionality into their applications or websites. One major advantage of cloud search services is that they are designed to handle large-scale data sets and provide powerful search capabilities that can be difficult to achieve with traditional search engines. Cloud search services can also provide advanced features, such as machine learning-powered search, natural language processing, and personalized recommendations, which can help improve the user experience and make search more efficient. Some examples of popular cloud search services include Amazon CloudSearch, Elasticsearch, and Azure Search. These services are typically offered on a pay-as-you-go basis, allowing businesses to pay only for the resources they use, making them an affordable option for businesses of all sizes.

In general, the system 100 may allow users to generate, revise and electronically sign electronic documents. When implemented as a large-scale cloud computing service, the system 100 may allow entities and organizations to amass a significant number of electronic documents, including both signed electronic documents and unsigned electronic documents. As such, the system 100 may need to manage a large collection of electronic documents for different entities, a task that is sometimes referred to as contract lifecycle management (CLM).

As shown in FIG. 1, the system 100 may include a server device 102 communicatively coupled to a set of client devices 112 via a network 114. The server device 102 may also be communicatively coupled to a set of client devices 116 via a network 118. The client devices 112 may be associated with a set of clients 134. The client devices 116 may be associated with a set of clients 136. In one network topology, the server device 102 may represent any server device, such as a server blade in a server rack as part of a cloud computing architecture, while the client devices 112 and the client devices 116 may represent any client device, such as a smart wearable (e.g., a smart watch), a smart phone, a tablet computer, a laptop computer, a desktop computer, a mobile device, and so forth. The server device 102 may be coupled to a local or remote data store 126 to store document records 138. It may be appreciated that the system 100 may have more or less devices than shown in FIG. 1 with a different network topology as needed for a given implementation. Embodiments are not limited in this context.

Figure 19:
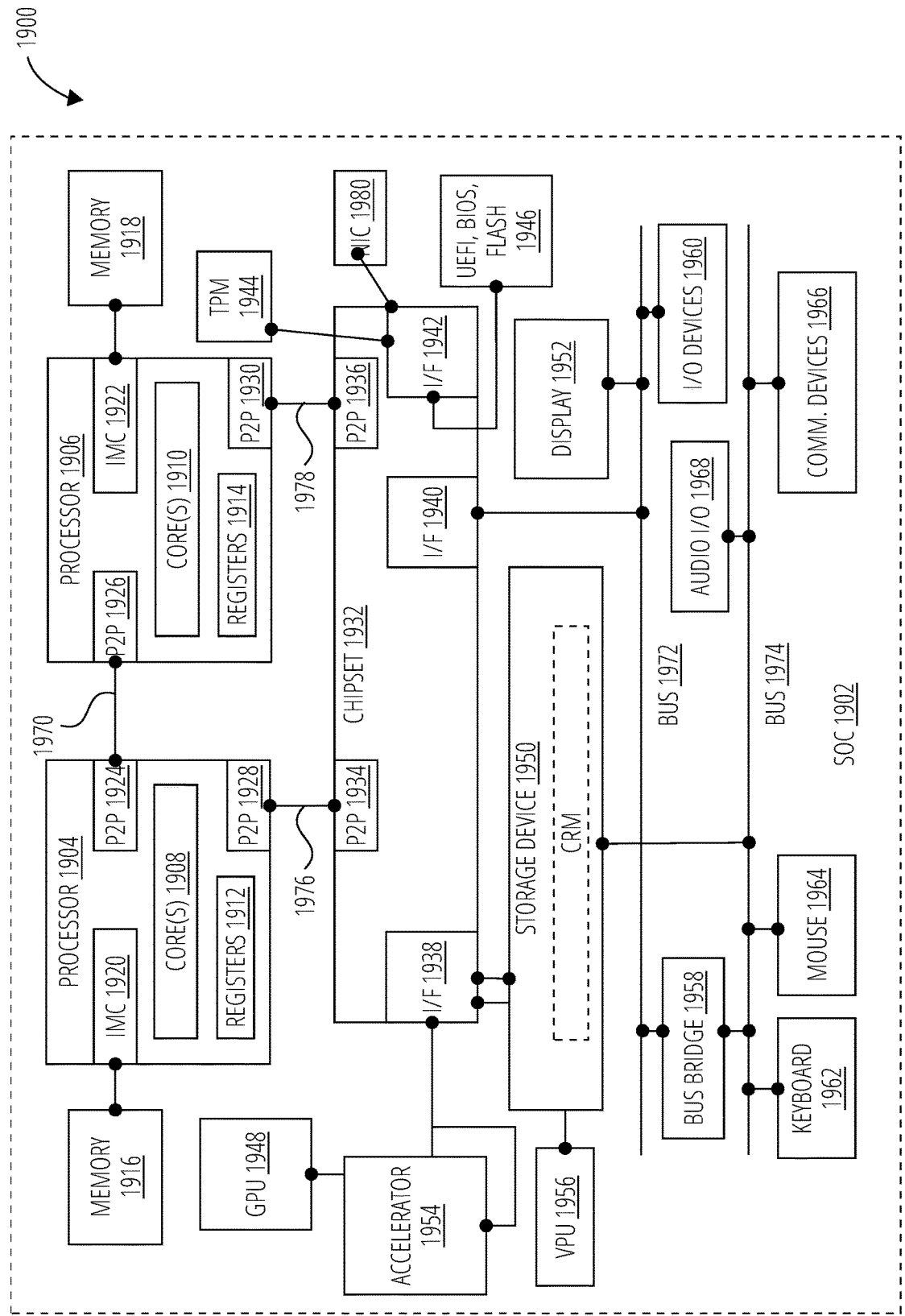
FIG. 19 illustrates a computing architecture in accordance with one embodiment.

In various embodiments, the server device 102 may include various hardware elements, such as a processing circuitry 104, a memory 106, a network interface 108, and a set of platform components 110. The client devices 112 and/or the client devices 116 may include similar hardware elements as those depicted for the server device 102. The server device 102, client devices 112, and client devices 116, and associated hardware elements, are described in more detail with reference to a computing architecture 1900 as depicted in FIG. 19.

Figure 20:
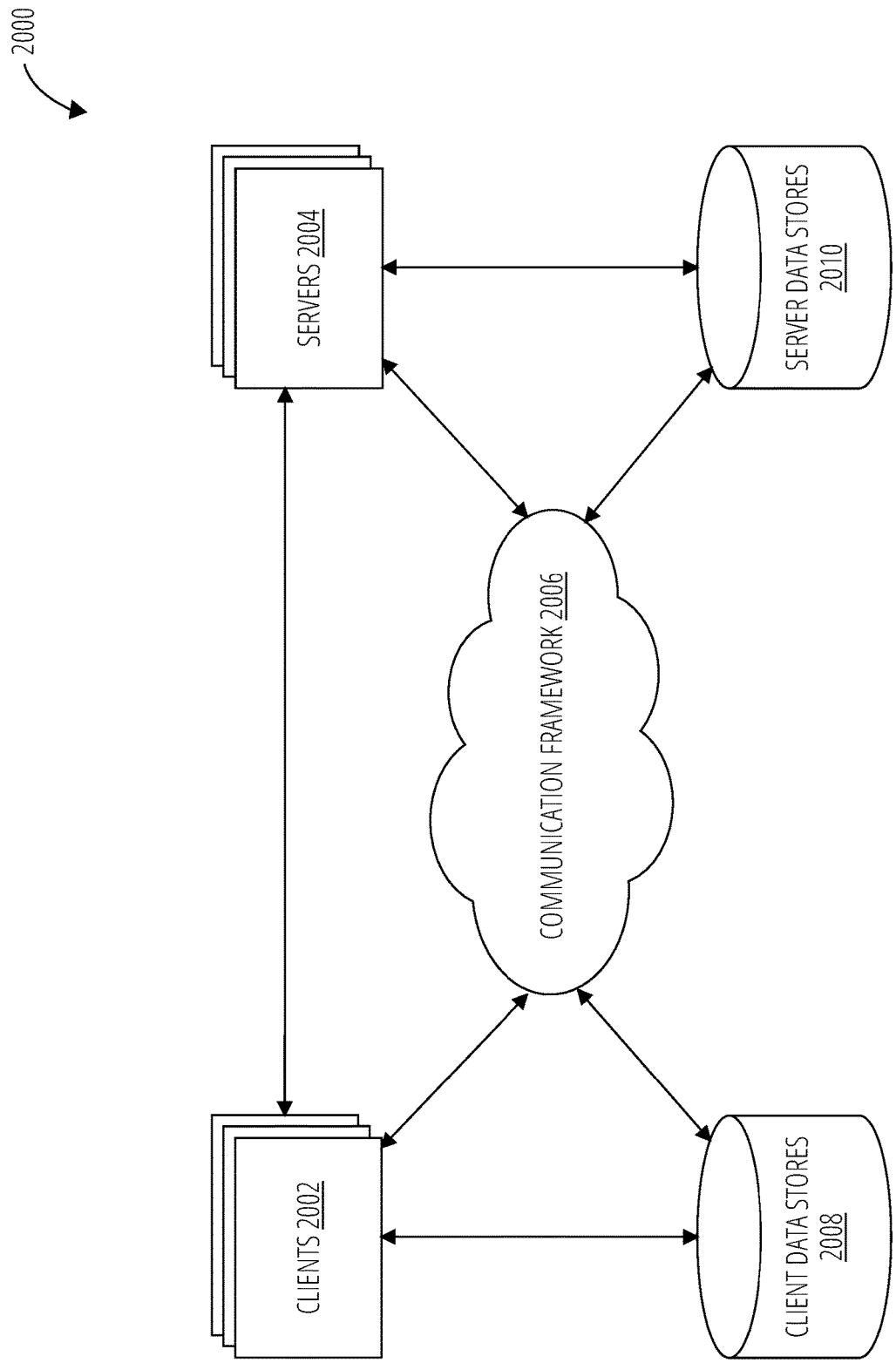
FIG. 20 illustrates a communications architecture in accordance with one embodiment.

In various embodiments, the server devices 102, 112 and/or 116 may communicate various types of electronic information, including control, data and/or content information, via one or both network 114, network 118. The network 114 and the network 118, and associated hardware elements, are described in more detail with reference to a communications architecture 2000 as depicted in FIG. 20.

The memory 106 may store a set of software components, such as computer executable instructions, that when executed by the processing circuitry 104, causes the processing circuitry 104 to implement various operations for an electronic document management platform. As depicted in FIG. 1, for example, the memory 106 may include a document manager 120, a signature manager 122, and a benchmarking dataset generation engine 150, among other software elements.

The document manager 120 may generally manage a collection of electronic documents stored as document records 138 in the data store 126. The document manager 120 may receive as input a document container 128 for an electronic document. A document container 128 is a file format that allows multiple data types to be embedded into a single file, sometimes referred to as a "wrapper" or "metafile." The document container 128 can include, among other types of information, an electronic document 142 and metadata for the electronic document 142.

A document container 128 may include an electronic document 142. The electronic document 142 may comprise any electronic multimedia content intended to be used in an electronic form. The electronic document 142 may comprise an electronic file having any given file format. Examples of file formats may include, without limitation, Adobe portable document format (PDF), Microsoft Word, PowerPoint, Excel, text files (.txt, .rtf), and so forth. In one embodiment, for example, the electronic document 142 may comprise a PDF created from a Microsoft Word file with one or more workflows developed by Adobe Systems Incorporated, an American multi-national computer software company headquartered in San Jose, California. Embodiments are not limited to this example.

In addition to the electronic document 142, the document container 128 may also include metadata for the electronic document 142. In one embodiment, the metadata may comprise signature tag marker element (STME) information 132 for the electronic document 142. The STME information 130 may include one or more STME 132, which are graphical user interface (GUI) elements superimposed on the electronic document 142. The GUI elements may include textual elements, visual elements, auditory elements, tactile elements, and so forth. In some embodiments, for example, the STME information 130 and STME 132 may be implemented as text tags, such as DocuSign anchor text, Adobe® Acrobat Sign® text tags, and so forth. Text tags are specially formatted text that can be placed anywhere within the content of an electronic document specifying the location, size, type of fields such as signature and initial fields, checkboxes, radio buttons, and form fields; and advanced optional field processing rules. Text tags can also be used when creating PDFs with form fields. Text tags may be converted into signature form fields when the document is sent for signature or uploaded. Text tags can be placed in any document type such as PDF, Microsoft Word, PowerPoint, Excel, and text files (.txt, .rtf). Text tags offer a flexible mechanism for setting up document templates that allow positioning signature and initial fields, collecting data from multiple parties within an agreement, defining validation rules for the collected data, and adding qualifying conditions. Once a document is correctly set up with text tags it can be used as a template when sending documents for signatures ensuring that the data collected for agreements is consistent and valid throughout the organization.

In one embodiment, the STME 132 may be utilized for receiving signing information, such as GUI placeholders for approval, checkbox, date signed, signature, social security number, organizational title, and other custom tags in association with the GUI elements contained in the electronic document 142. A client 134 may have used the client device 112 and/or the server device 102 to position one or more signature tag markers over the electronic document 142 with tools applications, and workflows developed by DocuSign or Adobe. For instance, assume the electronic document 142 is a commercial lease associated with STME 132 designed for receiving signing information to memorialize an agreement between a landlord and tenant to lease a parcel of commercial property. In this example, the signing information may include a signature, title, date signed, and other GUI elements.

The document manager 120 may process a document container 128 to generate a document image 140. The document image 140 is a unified or standard file format for an electronic document used by a given EDMP implemented by the system 100. For instance, the system 100 may standardize use of a document image 140 having an Adobe portable document format (PDF), which is typically denoted by a ".pdf" file extension. If the electronic document 142 in the document container 128 is in a non-PDF format, such as a Microsoft Word ".doc" or ".docx" file format, the document manager 120 may convert or transform the file format for the electronic document into the PDF file format. Further, if the document container 128 includes an electronic document 142 stored in an electronic file having a PDF format suitable for rendering on a screen size typically associated with a larger form factor device, such as a monitor for a desktop computer, the document manager 120 may transform the electronic document 142 into a PDF format suitable for rendering on a screen size associated with a smaller form factor device, such as a touch screen for a smart phone. The document manager 120 may transform the electronic document 142 to ensure that it adheres to regulatory requirements for electronic signatures, such as a "what you see is what you sign" (WYSIWYS) property, for example.

The signature manager 122 may generally manage signing operations for an electronic document, such as the document image 140. The signature manager 122 may manage an electronic signature process to send the document image 140 to signers, obtaining electronic signatures, verifying electronic signatures, and recording and storing the electronically signed document image 140. For instance, the signature manager 122 may communicate a document image 140 over the network 118 to one or more client devices 116 for rendering the document image 140. A client 136 may electronically sign the document image 140 and send the signed document image 140 to the server device 102 for verification, recordation, and storage.

Figure 5:
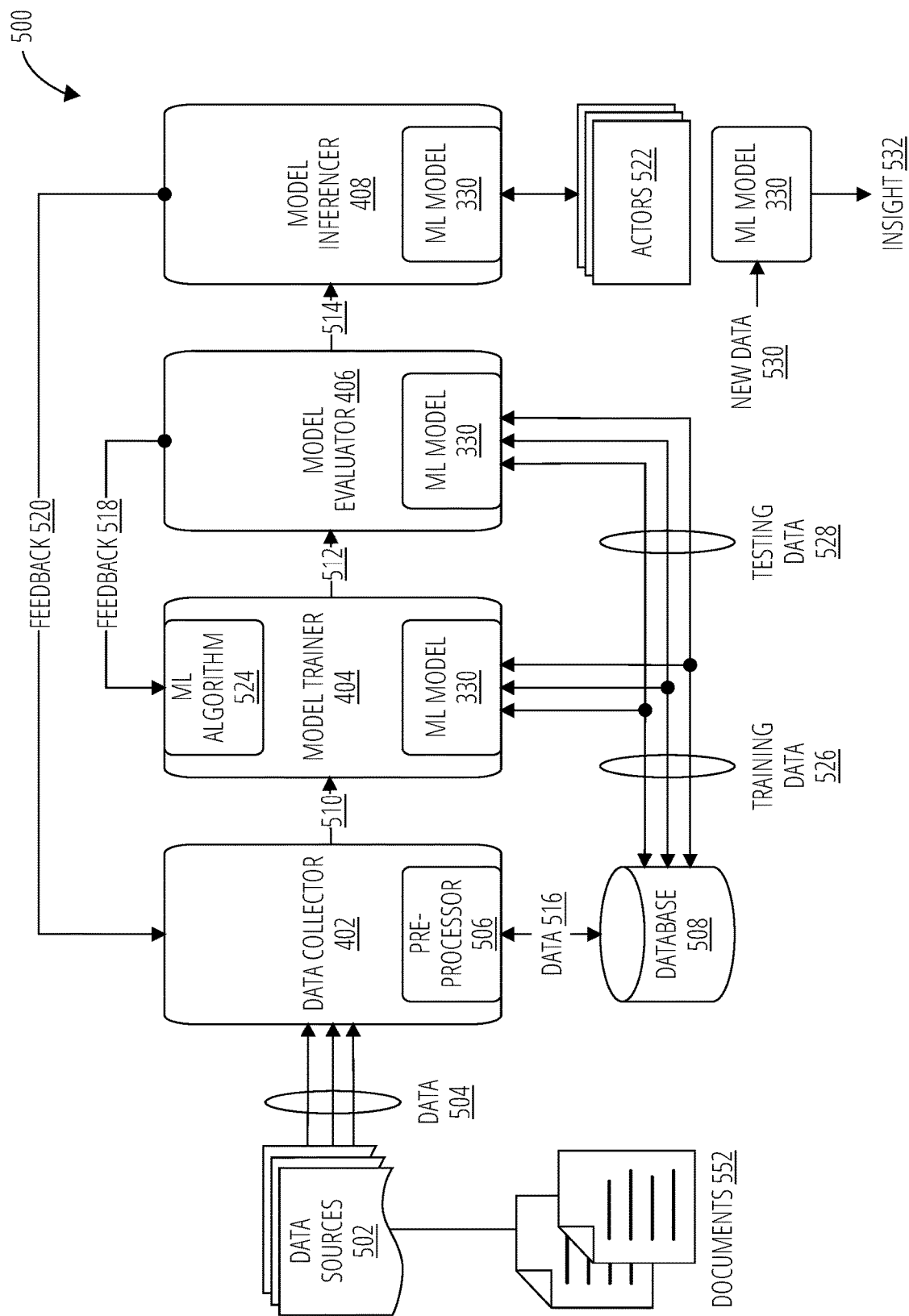
FIG. 5 illustrates an artificial intelligence architecture that may be used by the training device to generate the ML model for deployment by the inferencing device.

The benchmarking dataset generation engine 150 may implement and/or manage various artificial intelligence (AI) and machine learning (ML) agents to assist in various operational tasks for the EDMP of the system 100. The AI/ML agents and their operation associated with the benchmarking dataset generation engine 150, and associated software elements, are described in more detail with reference to an artificial intelligence architecture 500 as depicted in FIG. 5. The benchmarking dataset generation engine 150, and associated hardware elements, are described in more detail with reference to a computing architecture 1900 as depicted in FIG. 19.

In general operation, assume the server device 102 receives a document container 128 from a client device 112 over the network 114. The server device 102 processes the document container 128 and makes any necessary modifications or transforms as previously described to generate the document image 140. The document image 140 may have a file format of an Adobe PDF denoted by a ".pdf" file extension. The server device 102 sends the document image 140 to a client device 116 over the network 118. The client device 116 renders the document image 140 with the STME 132 in preparation for electronic signing operations to sign the document image 140.

Figure 7:
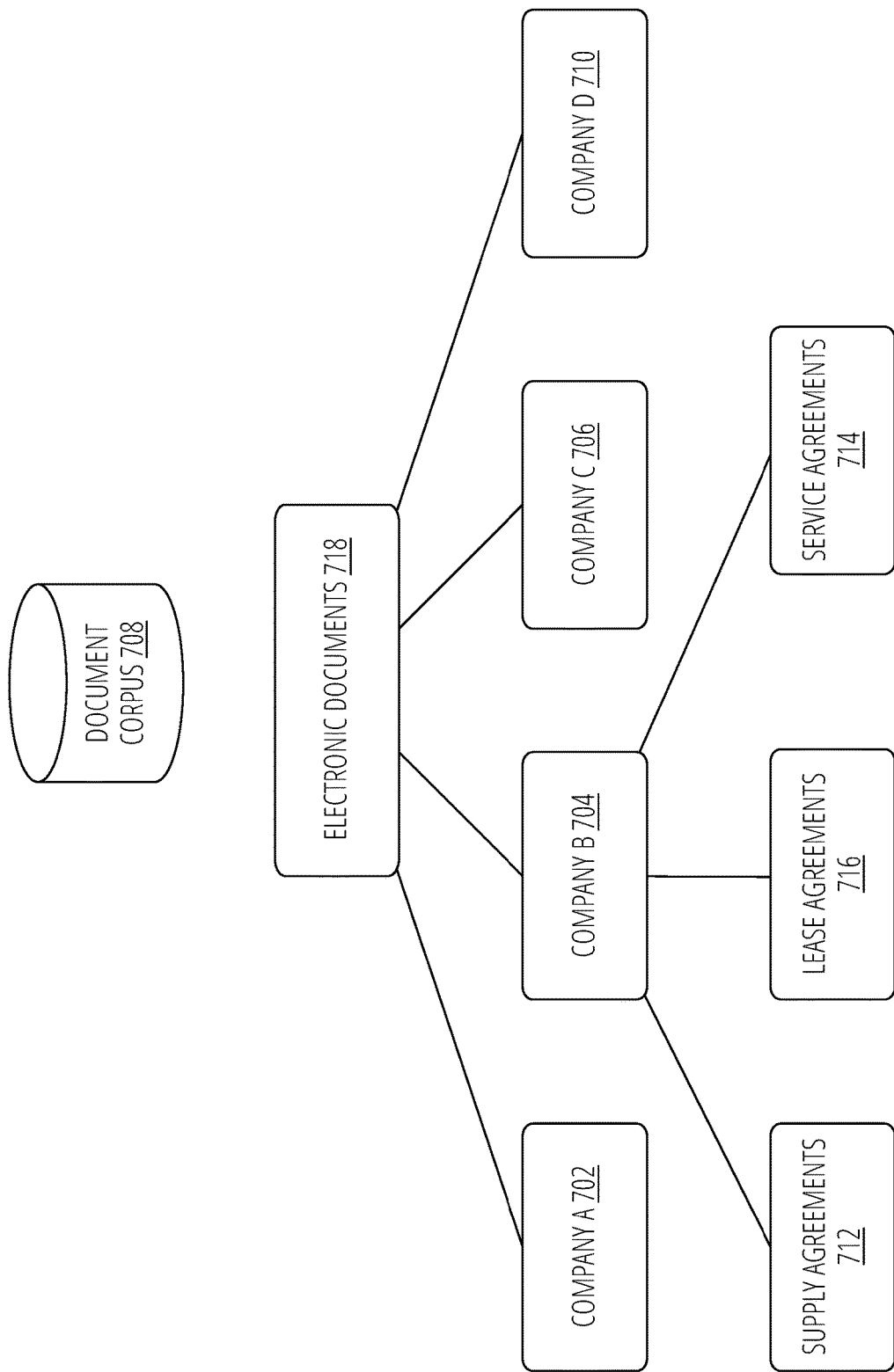
FIG. 7 illustrates a document corpus in accordance with one embodiment.

The document image 140 may further be associated with STME information 130 including one or more STME 132 that were positioned over the document image 140 by the client device 112 and/or the server device 102. The STME 132 may be utilized for receiving signing information (e.g., approval, checkbox, date signed, signature, social security number, organizational title, etc.) in association with the GUI elements contained in the document image 140. For instance, a client 134 may use the client device 112 and/or the server device 102 to position the STME 132 over the electronic documents 718, as shown in FIG. 7, with tools, applications, and workflows developed by DocuSign. For example, the electronic documents 718 may be a commercial lease that is associated with one or more or more STME 132 for receiving signing information to memorialize an agreement between a landlord and tenant to lease a parcel of commercial property. For example, the signing information may include a signature, title, date signed, and other GUI elements.

Broadly, a technological process for signing electronic documents may operate as follows. A client 134 may use a client device 112 to upload the document container 128, over the network 114, to the server device 102. The document manager 120, at the server device 102, receives and processes the document container 128. The document manager 120 may confirm or transform the electronic document 142 as a document image 140 that is rendered at a client device 116 to display the original PDF image including multiple and varied visual elements. The document manager 120 may generate the visual elements based on separate and distinct input including the STME information 130 and the STME 132 contained in the document container 128. In one embodiment, the PDF input in the form of the electronic document 142 may be received from and generated by one or more workflows developed by Adobe Systems Incorporated. The STME 132 input may be received from and generated by workflows developed by DocuSign. Accordingly, the PDF and the STME 132 are separate and distinct input as they are generated by different workflows provided by different providers.

The document manager 120 may generate the document image 140 for rendering visual elements in the form of text images, table images, STME images and other types of visual elements. The original PDF image information may be generated from the document container 128 including original documents elements included in the electronic document 142 of the document container 128 and the STME information 130 including the STME 132. Other visual elements for rendering images may include an illustration image, a graphic image, a header image, a footer image, a photograph image, and so forth.

The signature manager 122 may communicate the document image 140 over the network 118 to one or more client devices 116 for rendering the document image 140. The client devices 116 may be associated with clients 136, some of which may be signatories or signers targeted for electronically signing the document image 140 from the client 134 of the client device 112. The client device 112 may have utilized various work flows to identify the signers and associated network addresses (e.g., email address, short message service, multimedia message service, chat message, social message, etc.). For example, the client 134 may utilize workflows to identify multiple parties to the lease including bankers, landlord, and tenant. Further, the client 134 may utilize workflows to identify network addresses (e.g., email address) for each of the signers. The signature manager 122 may further be configured by the client 134 whether to communicate the document image 140 in series or parallel. For example, the signature manager 122 may utilize a workflow to configure communication of the document image 140 in series to obtain the signature of the first party before communicating the document image 140, including the signature of the first party, to a second party to obtain the signature of the second party before communicating the document image 140, including the signature of the first and second party to a third party, and so forth. Further for example, the client 134 may utilize workflows to configure communication of the document image 140 in parallel to multiple parties including the first party, second party, third party, and so forth, to obtain the signatures of each of the parties irrespective of any temporal order of their signatures.

The signature manager 122 may communicate the document image 140 to the one or more parties associated with the client devices 116 in a page format. Communicating in page format, by the signature manager 122, ensures that entire pages of the document image 140 are rendered on the client devices 116 throughout the signing process. The page format is utilized by the signature manager 122 to address potential legal requirements for binding a signer. The signature manager 122 utilizes the page format because a signer is only bound to a legal document that the signer is intended to be bound. To satisfy the legal requirement of intent, the signature manager 122 generates PDF image information for rendering the document image 140 to the one or more parties with a "what you see is what you sign" (WYSIWYS) property. The WYSIWYS property ensures the semantic interpretation of a digitally signed message is not changed, either by accident or by intent. If the WYSIWYS property is ignored, a digital signature may not be enforceable at law. The WYSIWYS property recognizes that, unlike a paper document, a digital document is not bound by its medium of presentation (e.g., layout, font, font size, etc.) and a medium of presentation may change the semantic interpretation of its content. Accordingly, the signature manager 122 anticipates a possible requirement to show intent in a legal proceeding by generating original PDF image information for rendering the document image 140 in page format. The signature manager 122 presents the document image 140 on a screen of a display device in the same way the signature manager 122 prints the document image 140 on the paper of a printing device.

As previously described, the document manager 120 may process a document container 128 to generate a document image 140 in a standard file format used by the system 100, such as an Adobe PDF, for example. Additionally, or alternatively, the document manager 120 may also implement processes and workflows to prepare an electronic document 142 stored in the document container 128. For instance, assume a client 134 uses the client device 112 to prepare an electronic document 142 suitable for receiving an electronic signature, such as the lease agreement in the previous example. The client 134 may use the client device 112 to locally or remotely access document management tools, features, processes and workflows provided by the document manager 120 of the server device 102. The client 134 may prepare the electronic document 142 as a brand new originally written document, a modification of a previous electronic document, or from a document template with predefined information content. Once prepared, the signature manager 122 may implement electronic signature (e-sign) tools, features, processes and workflows provided by the signature manager 122 of the server device 102 to facilitate electronic signing of the electronic document 142.

In addition, as discussed above, the system 100 may include a benchmarking dataset generation engine 150. The benchmarking dataset generation engine 150 may implement a set of tools and/or algorithms to generate one or more labels for electronic documents and/or any parts thereof that may be used to train and/or evaluate one or more large language models. The benchmarking dataset generation engine 150 may be configured to retrieve one or more first electronic documents from a plurality of electronic data sources. For example, as stated above, the data sources may include various databases, e.g., government databases, public databases, etc., where electronic documents may be stored without specific identifiers and/or other ways of particularly determining how each portion of an electronic document may be identified (e.g., whether a particular clause in a sales agreement relates to termination, governing law, etc.). Document retrieval may be accomplished in response to a query and/or in any desired way. Using the retrieved documents, the benchmarking dataset generation engine 150 may then be configured to generate one or more requests and/or queries to a generative AI model for generation of one or more summaries of electronic documents. The queries may be initially generated based on the retrieved documents. Any modified queries may be modified using one or more parameters and/or attributes (e.g., type of documents, length of documents, specific entities associated with the documents, etc.) of the retrieved documents. The benchmarking dataset generation engine 150 may then provide the queries (either initially generated and/or modified) to the generative AI model and request it to generate one or more summaries of electronic document(s). The summaries may then be used by the benchmarking dataset generation engine 150 to generate one or more labels for the electronic documents. The labels may be validated (e.g., through subject matter analysis (either automatically and/or manually by a subject matter expert)). The validated labels may then be generated for the electronic documents.

Along with generating of the validated labels, the benchmarking dataset generation engine 150 may be configured to generate one or more rules for analysis of the validated labels. The rules may be related to specific types of electronic document (e.g., sales agreements, lease agreements, etc.), specific subject matter identified in the documents (e.g., termination provisions in sales agreements, etc.), specific large language models (LLM) that may be used for analyzing particular type of documents (e.g., an LLM that may be used to analyze lease agreements), and/or any other type of rules. An example of a rule may include: "a termination label is to be assigned to termination and term provisions of an agreement after analysis of the agreement, and if other than termination label is assigned to termination and term provision of the agreement, then the label is incorrect and needs to be discarded, otherwise the label is acceptable."

The benchmarking dataset generation engine 150 may be configured to use the generated rules to analyze the validated labels. If the benchmarking dataset generation engine 150 determines that at least one validated label complies with the generated rules, the engine 150 may accept the validated label for the electronic documents, and hence be included in the benchmarking dataset that may then be used for training and/or evaluation of a large language model. Otherwise, if the benchmarking dataset generation engine 150 determines that at least one validated label failed to comply with the generated rules, it may prevent use of such validated label for labeling the electronic documents, and hence exclude it from the benchmarking dataset.

Figure 2:
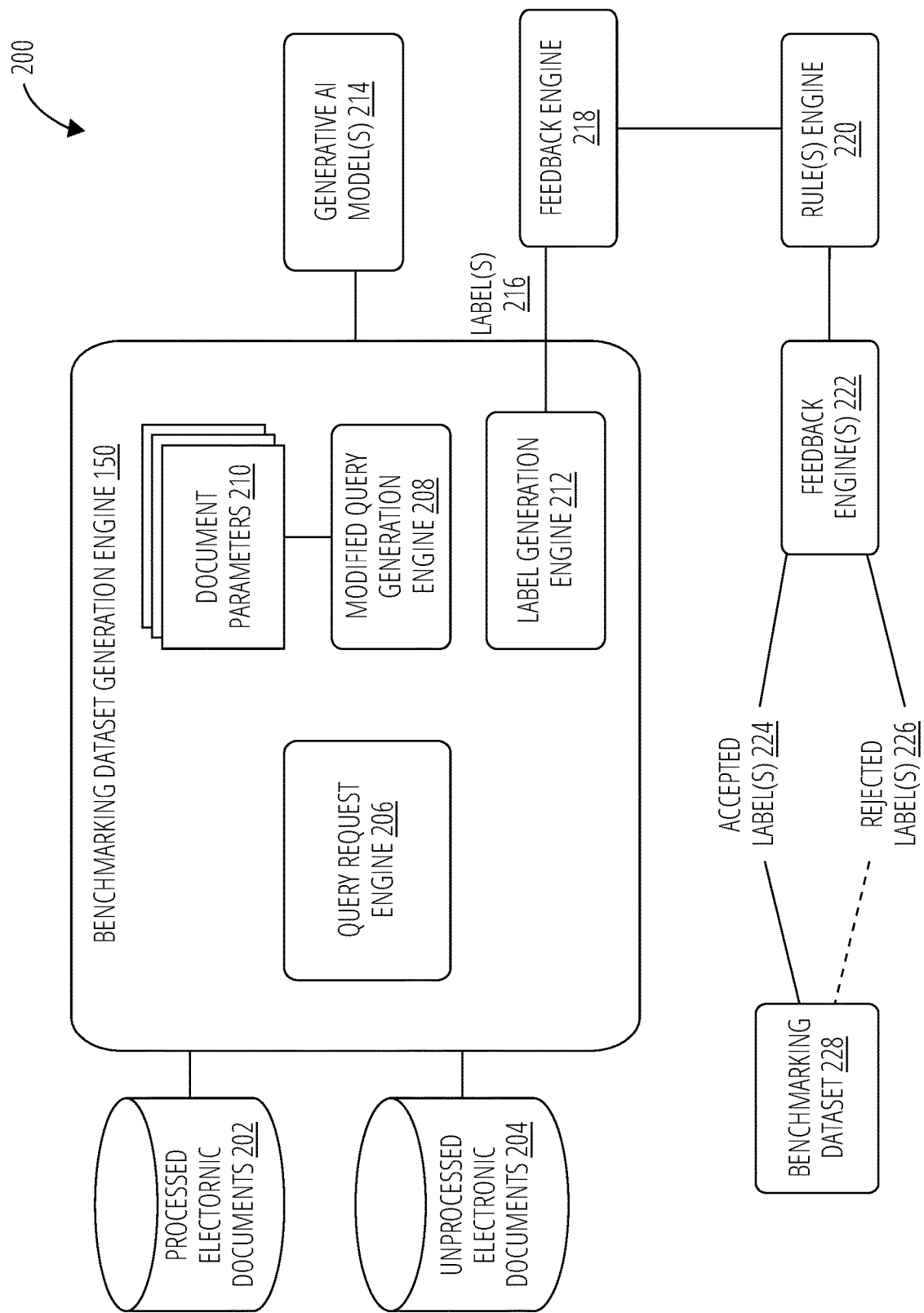
FIG. 2 illustrates example benchmark processing system that may include a benchmarking dataset generation engine, according to some embodiments of the current subject matter.

FIG. 2 illustrates example benchmark processing system 200 that may include the benchmarking dataset generation engine 150, according to some embodiments of the current subject matter. The benchmarking dataset generation engine 150 may be communicatively coupled to one or more electronic document storage sources 202 and 204 and may include a query request engine 206, a modified query generation engine 208, one or more storage locations storing document parameters 210, and a label generation engine 212. The benchmarking dataset generation engine 150 may also be communicatively coupled to a generative AI model(s) 214 for generation of one or more summaries, as discussed herein. The benchmarking dataset generation engine 150 may also be configured to be communicatively coupled to a feedback engine 218, which in turn, may be communicatively coupled to a rule(s) engine 220 and/or one or more feedback engine(s) 222. The system 200 may be configured to generate one or more benchmarking datasets that may include one or more accepted label(s) 224 that may result from one or more processes executed by one or more components of the system 200. The system 200 may also generate one or more labels that are not accepted (e.g., rejected label(s) 226), which do not become part of the benchmarking dataset.

One or more components of the system 200 shown in FIG. 2 may be communicatively coupled using one or more communications networks. The communications networks may include one or more of the following: a wired network, a wireless network, a metropolitan area network ("MAN"), a local area network ("LAN"), a wide area network ("WAN"), a virtual local area network ("VLAN"), an internet, an extranet, an intranet, and/or any other type of network and/or any combination thereof.

Further, one or more components of the system 200 may include any combination of hardware and/or software. In some embodiments, one or more components of the system may be disposed on one or more computing devices, such as, server(s), database(s), personal computer(s), laptop(s), cellular telephone(s), smartphone(s), tablet computer(s), virtual reality devices, and/or any other computing devices and/or any combination thereof. In some example embodiments, one or more components of the system may be disposed on a single computing device and/or may be part of a single communications network. Alternatively, or in addition to, such devices may be separately located from one another. A device may be a computing processor, a memory, a software functionality, a routine, a procedure, a call, and/or any combination thereof that may be configured to execute a particular function associated with interface and/or document certification processes disclosed herein.

In some embodiments, one or more components of the system 200 may include network-enabled computers. As referred to herein, a network-enabled computer may include, but is not limited to a computer device, or communications device including, e.g., a server, a network appliance, a personal computer, a workstation, a phone, a smartphone, a handheld PC, a personal digital assistant, a thin client, a fat client, an Internet browser, or other device. One or more components of the system also may be mobile computing devices, for example, an iPhone, iPod, iPad from Apple® and/or any other suitable device running Apple's iOS® operating system, any device running Microsoft's Windows®. Mobile operating system, any device running Google's Android® operating system, and/or any other suitable mobile computing device, such as a smartphone, a tablet, or like wearable mobile device.

One or more components of the system 200 may include a processor and a memory, and it is understood that the processing circuitry may contain additional components, including processors, memories, error and parity/CRC checkers, data encoders, anti-collision algorithms, controllers, command decoders, security primitives and tamper-proofing hardware, as necessary to perform the interface and/or document certification functions described herein. One or more components of the system may further include one or more displays and/or one or more input devices. The displays may be any type of devices for presenting visual information such as a computer monitor, a flat panel display, and a mobile device screen, including liquid crystal displays, light-emitting diode displays, plasma panels, and cathode ray tube displays. The input devices may include any device for entering information into the user's device that is available and supported by the user's device, such as a touch-screen, keyboard, mouse, cursor-control device, touch-screen, microphone, digital camera, video recorder or camcorder. These devices may be used to enter information and interact with the software and other devices described herein.

In some example embodiments, one or more components of the system 200 may execute one or more applications, such as software applications, that enable, for example, network communications with one or more components of system and transmit and/or receive data.

One or more components of the system 200 may include and/or be in communication with one or more servers via one or more networks and may operate as a respective front-end to back-end pair with one or more servers. One or more components of the system may transmit, for example from a mobile device application (e.g., executing on one or more user devices, components, etc.), one or more requests to one or more servers. The requests may be associated with retrieving data from servers (e.g., retrieving one or more electronic documents from document storage sources 202 and/or 204). The servers may receive the requests from the components of the system. Based on the requests, servers may be configured to retrieve the requested data from one or more storage locations. Based on receipt of the requested data from the databases, the servers may be configured to transmit the received data to one or more components of the system, where the received data may be responsive to one or more requests.

The system 200 may include one or more networks, such as, for example, networks that may be communicatively coupling the engine 150, the document storage sources 202 and/or 204, the generative AI model 218, and/or any other computing components. In some embodiments, networks may be one or more of a wireless network, a wired network or any combination of wireless network and wired network and may be configured to connect the components of the system and/or the components of the system to one or more servers. For example, the networks may include one or more of a fiber optics network, a passive optical network, a cable network, an Internet network, a satellite network, a wireless local area network (LAN), a metropolitan area network (MAN), a wide area network (WAN), a virtual local area network (VLAN), an extranet, an intranet, a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or any other type of network and/or any combination thereof.

In addition, the networks may include, without limitation, telephone lines, fiber optics, IEEE Ethernet 802.3, a wide area network, a wireless personal area network, a LAN, or a global network such as the Internet. Further, the networks may support an Internet network, a wireless communication network, a cellular network, or the like, or any combination thereof. The networks may further include one network, or any number of the exemplary types of networks mentioned above, operating as a stand-alone network or in cooperation with each other. The networks may utilize one or more protocols of one or more network elements to which they are communicatively coupled. The networks may translate to or from other protocols to one or more protocols of network devices. The networks may include a plurality of interconnected networks, such as, for example, the Internet, a service provider's network, a cable television network, corporate networks, such as credit card association networks, and home networks.

The system 200 may include one or more servers, which may include one or more processors that may be coupled to memory. Servers may be configured as a central system, server or platform to control and call various data at different times to execute a plurality of workflow actions. Servers may be configured to connect to the one or more databases. Servers may be incorporated into and/or communicatively coupled to at least one of the components of the system.

Further, one or more components of the system 200 may be configured to execute one or more actions using one or more containers. In some embodiments, each action may be executed using its own container. A container may refer to a standard unit of software that may be configured to include the code that may be needed to execute the action along with all its dependencies. This may allow execution of actions to run quickly and reliably.

As shown in FIG. 2, the benchmarking dataset generation engine 150 may be configured to execute a query to retrieve one or more electronic documents from one or more electronic document storage sources 202 and/or 204. Alternatively, or in addition, the electronic documents may be provided to the benchmarking dataset generation engine 150 without a query and/or any other type of request. The electronic document data sources 202, 204 may be any type of data sources, e.g., databases, servers, and/or any other storage locations.

Data storage source 202 may be configured to be one or more private databases, access to which might not be publicly available (e.g., internal company databases, specific user access databases, etc.). The electronic documents stored in these databases may be organized in a predetermined fashion, which may allow ease of access to the electronic documents and/or any portions thereof. For example, electronic documents stored in these databases may be labeled, searchable, and/or otherwise, easily identifiable. The documents may be stored in a particular electronic format (e.g., PDF, .docx, etc.).

Data storage source 204 may be configured to be public non-government databases, government databases (e.g., SEC-EDGAR, etc.), etc. that may store various electronic documents, such as, for instance, legal documents (e.g., commercial contracts, lease agreements, public disclosures (e.g., 10 k statements, 5 k statements, quarterly reports, etc.). The electronic documents stored in these databases may be identified using various identifiers, which may allow location of these documents in the databases, however, contents of electronic documents stored therein might not be parsed and/or specifically identified. For example, a review of the entire electronic document (e.g., 10 k statement of a company stored in SEC-EDGAR database) may need to be performed to identify a particular section (e.g., a section related to compensation of executives for the company).

Upon receiving electronic documents from the sources 202 and/or 204, the query request engine 206 of the benchmarking dataset generation engine 150 may be configured to form one or more queries or requests that may be sent to the generative AI model(s) 214. The query request engine 206 may be configured to request the generative AI model(s) 214 to generate one or more summaries of the electronic documents and/or portions thereof retrieved from sources 202, 204. As can be understood, any types of requests may be submitted to the generative AI model(s) 214, resulting in any summaries of electronic documents. The generative AI model(s) 214 may receive the request, generate summaries for further processing by the benchmarking dataset generation engine 150 (e.g., for generation of one or more label(s) 216).

The generative AI model 214 may be part of the system 200 and/or be one or more third party models (e.g., ChatGPT, Bard, DALL-E, Midjourney, DeepMind, etc.). In some embodiments, the generative AI model 214 may be provided with the electronic documents and/or any portions thereof and may use the provided information to generate one or more summaries. For example, the generative AI model 214 may be provided with the sales agreement, one or more selected portions of the agreement related to termination, and may be instructed to generate different summaries that may be summaries of the entire agreement and/or specific to the termination provisions. The generative AI model 214 may be requested to generate different sizes of summaries (e.g., small, medium, and/or large). The summaries may be returned to the benchmarking dataset generation engine 150, and in particular to the query request engine 206, which, in turn, may be configured to request the modified query generation engine 208 to generate one or more modified queries. The modified queries may be based on the initially generated queries and one or more document parameters 210. The document parameters 210 may include a type of the electronic document (e.g., a sales agreement, a lease agreement, etc.), a length of the electronic document (e.g., 10 pages, 100 pages, etc.), specific entities associated with and/or referred to in the electronic document (e.g., Company A, John Doe, etc.), and/or any other parameters. The modified queries may be provided to the generative AI model 214 to generate one or more summaries of the electronic documents. The modified queries may be provided together with the initially generated queries for generation of the summaries.

The documents that may be analyzed by the generative AI model(s) 214 may be specific to a particular topic, type of documents, etc. (e.g., "lease agreements", "master purchase agreements", etc.) and/or may contain a particular provision (e.g., any agreements governed by the law of California, etc.). The queries or requests (whether initial or modified) to the generative AI models may be submitted in any desired language, code, form, etc. Moreover, the queries/requests may, for example, request the generative AI model(s) 214 to generate different size summaries. For instance, the requests to generate a small document summary may be in the form of "—You are a personal assistant.\n"
"—The user will provide a legal text such as an agreement.\n"
"—Generate three different summaries using complete sentences to summarize the agreement.\n"
"—Each summary should be of short length, with at least 90 words.\n"
"—Each summary should cover different aspects of the agreement.\n"
"—Each summary should be different from the other summaries and not have any overlap.\n"
"—List all the summaries one after the other."

A request to generate medium size summary of an electronic document may be in the form of "—You are a personal assistant.\n"
"—The user will provide a legal text such as an agreement.\n"
"—Generate three different summaries using complete sentences to summarize the agreement.\n"
"—Each summary should be of medium length, with at least 125 words.\n"
"—Each summary should cover different aspects of the agreement.\n"
"—Each summary should be different from the other summaries and not have any overlap.\n"
"—List all the summaries one after the other."

A request to generate a long size summary of an electronic document may be in the form of "—You are a personal assistant.\n"
"—The user will provide a legal text such as an agreement.\n"
"—Generate three different summaries using complete sentences to summarize the agreement.\n"
"—Each summary should be long, with at least 175 words.\n"
"—Each summary should cover different aspects of the agreement.\n"
"—Each summary should be different from the other summaries and not have any overlap.\n"
"—List all the summaries one after the other."

As can be understood, the generative AI model 214 may be requested to generate any type of summaries. The outputted summaries may be in any desired format, e.g., natural language format, code, etc. For instance, with regard to a lease agreement and in particular, its termination clause, a generated query may be "what is the term limit of the agreement?", "what is the governing law of the agreement?" The responsive summary may be in the form "The term of this lease agreement is five years, which is extendible by up to additional five years upon prior written agreement of the parties. The governing law of this lease agreement is the law of the State of California, except for the provisions related to the termination."

The query request engine 206, upon receiving an initial summary from the generative AI model 214, may pass the initial summary to the modified query generation engine 208, which may use one or more document parameters 210 to generate a further request or a modified query to be sent to the generative AI model 214 to generate a modified summary of the electronic document. For example, the query for initial summary may ask "generate a summary of a termination provision of this agreement." The request for modified summary may rely on one or more document parameters (e.g., type of document, parties involved, etc.) and may state as follows: "generate a summary of a termination provision of this lease agreement from the point of view of Company A." The generative AI model(s) 214 may be configured to return requested summaries to the benchmarking dataset generation engine 150.

Using the returned summaries, the label generation engine 212 may be configured to generate one or more labels 216. The label(s) 216 may be actual extracted paragraphs, sentences, phrases, words, alpha-numeric characters and/or any other portions of electronic documents. Alternatively, or in addition, the label(s) 216 may be any other type of labels that may be generated based on the extracted paragraphs, sentences, phrases, words, alpha-numeric characters and/or any other portions of electronic documents.

The label(s) 216 may be provided to the feedback engine 218 for review. The feedback engine 218 may execute a semantic-similarity, content, and/or subject matter review of the label(s) 216 versus the portions of the documents to which the label(s) has been assigned. The subject matter review may involve analyzing content of the label(s) 220 and corresponding portions of the electronic documents that have been labeled with one or more labels 216. The content-based subject matter review discard labels that incorrectly (or semantically mismatch or have unrelated content) label portions of the electronic documents (e.g., "termination label" assigned to "governing law of agreement" clause). If the label is correctly assigned then, it may be initially accepted. Additionally, a rule related to review of the labels may be generated by the rule(s) engine 220 (e.g., "if a clause of a document includes 'term', 'termination', then the label 'termination' should be assigned to that clause").

In some embodiments, the content-based subject matter review of the label(s) 216 may include user feedback. The review process may be executed by the feedback engine 218 once and/or continuously, such as, for example, upon receiving updated labels 216. The feedback may include, for example, a vote, written feedback, a "thumbs up", "thumbs down", etc. The feedback may be used to update, revise, modify, delete, change, and/or perform any other operations with regard to processes performed by the query request engine 206, modified query generation engine 208, label generation engine 212, and/or any other processes executed by the benchmarking dataset generation engine 150. Further, the feedback may be used in training any machine learning models that may be executed by any of the components of the benchmarking dataset generation engine 150. Alternatively, or in addition, the feedback may be used to update, revise, modify, delete, change, and/or perform any other operations with regard to a particular output that may have been generated during generation of labels 220. Such operations (e.g., updates, revision, etc. to how operations are performed and to the output) may be performed simultaneously, one after the other, and/or in any other desired fashion. Further, these operations may be executed in real-time, as soon as feedback is received, and/or at any other desired time. In some example embodiments, the feedback may be fed back into one or more of the previous phases, and may be used to adjust, for example, how labels 216 may be generated, how questions/queries, rephrased questions/queries/keywords, embeddings, may be generated and/or how responses may be extracted from the electronic documents, as well as how processing of specific tasks (and/or requests associated therewith) may be performed using the generative AI model, etc., where user feedback may be used to refine prompts submitted to the generative AI models, and/or for any other purpose(s).

The generated rules by the rule(s) engine 220 and the initial set of labels 216 reviewed by the feedback engine 218 may be sent to one or more feedback engine(s) 222 for further review. The review again may be content-based and/or user feedback back based, as discussed above. If the engine(s) 222 come to an agreement on a set of labels, a set of accepted label(s) 224 may be outputted. Otherwise, if there is no agreement as to a specific label for labeling a portion of electronic document(s), the label may be included in a set of rejected label(s) 226. One or both of the sets of labels 224, 226 may be used to form the benchmarking dataset 228.

In some example embodiments, the rule(s) engine 220 may rely on various methodologies to generate rules or guidelines for reviewing the labels 216. For example, one methodology may involve recall and precision methodology that may be based on top n label recommendations above a predetermined threshold t, whereby a recall parameter (R) may be determined as:
R=(number of top n recommendations above a threshold t that are answers)/(number of all answers)
A precision parameter (P) may be defined as:
P=(number of top n recommendations above threshold t that are answers)/(number of recommendations above threshold t)
The validation rule may be defined as follows:

$$\text{Rule} = 2*R*P/(R+P)$$

Another methodology may involve a normalized discounted cumulative gain (NDCG) methodology. This methodology involves variable rel_i that may be defined as relevance of a returned result at position i. If irrelevant, it may be 0. Better answers may have higher relevance scores. NDCG may be defined as follows:

$$nDCG_p = \frac{DCG_p}{IDCG_p}$$

Where $$IDCG_p = \sum_{i=1}^{|REL_p|} \frac{2^{rel_i} - 1}{\log_2(i+1)}$$

Any results may be sorted by relevance, where IDCG may refer to the best possible discounted cumulative gain score that may be received. The DCG may be defined as follows:

$$DCG_p = \sum_{i=1}^{p} \frac{2^{rel_i} - 1}{\log_2(i+1)}$$

The NDCG may be limited as compared to recall and precision methodology discussed above, as it does not penalize for bad documents in the results (which may be addressed by the precision), and it does not penalize missing documents in the results (which may be addressed by the recall).

The set of accepted label(s) 224 may form a benchmarking dataset 228 of labels. Such benchmarking dataset of labels may then be used to train and/or evaluate one or more large language models. For example, the benchmarking dataset 228 may determine whether a particular large language model is correctly labeling portions of electronic documents. If labels are incorrectly assigned by the large language model, the model may be deemed as ineffective and/or untrained. The benchmarking dataset 228 may then be used to train the model. As can be understood, effectiveness of a particular large language model may be determined on a case-by-case basis, where one or more effectiveness thresholds may be defined to indicate whether or not a particular model is effective and thus, may be used to process an electronic document.

As discussed above, the benchmarking dataset generation engine 150 may be configured to rely on one or more machine learning models. For example, such models may be used to generate queries related to electronic documents, generate labels, etc. The models may be used for generation of prompts to the generative AI model 214 for generation of initial and/or modified summaries, as well as for performing of any other tasks by the benchmarking dataset generation engine 150.

Figure 3:
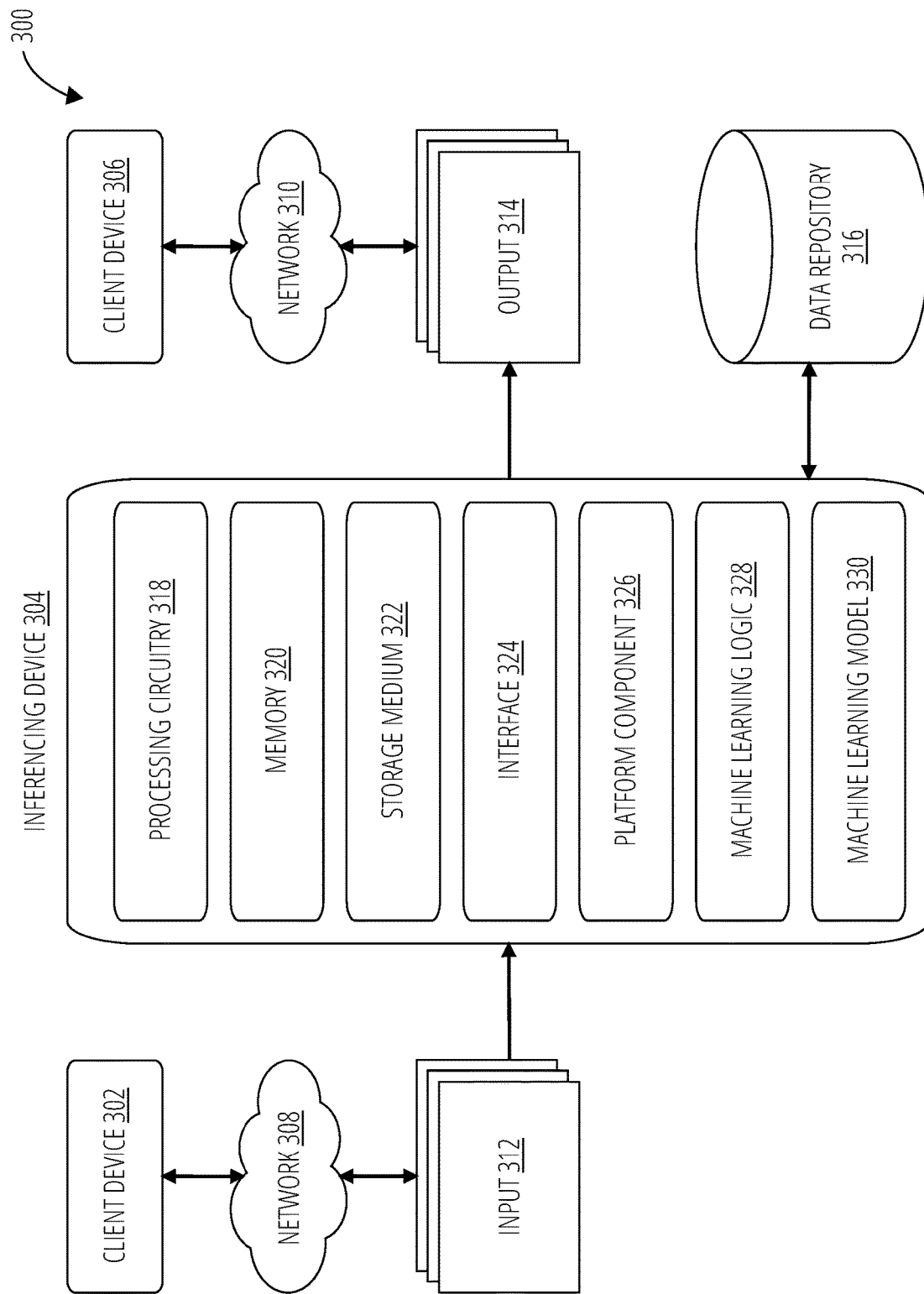
FIG. 3 illustrates an example of an AI/ML system that may be used for generating one or more transaction packages and/or guiding the user through one or more tasks, documents, etc., according to some embodiments of the current subject matter.

FIG. 3 illustrates an example of an AI/ML system 300 that may be used by the benchmarking dataset generation engine 150, according to some embodiments of the current subject matter. The system 300 may include a set of M devices, where M is any positive integer. As shown in FIG. 3, the system 300 may include three devices (M=3), such as a client device 302, an inferencing device 304, and a client device 306. The inferencing device 304 may communicate information with the client device 302 and the client device 306 over a network 308 and a network 310, respectively. The information may include input 312 from the client device 302 and output 314 to the client device 306, or vice-versa. In some embodiments, the input 312 and the output 314 may be communicated between the same client device 302 or client device 306. In another alternative, the input 312 and the output 314 may be stored in a data repository 316. Alternatively, or in addition, the input 312 and the output 314 are communicated via a platform component 326 of the inferencing device 304, such as an input/output (I/O) device (e.g., a touchscreen, a microphone, a speaker, etc.).

As shown in FIG. 3, the inferencing device 304 may include a processing circuitry 318, a memory 320, a storage medium 322, an interface 324, a platform component 326, ML logic 328, and an ML model 330. In some embodiments, the inferencing device 304 may include other components and/or devices as well. Examples for software elements and hardware elements of the inferencing device 304 are described in more detail with reference to a computing architecture 1900 as depicted in FIG. 19. Embodiments are not limited to these examples.

The inferencing device 304 may generally be arranged to receive an input 312, process the input 312 via one or more AI/ML techniques, and send an output 314. The inferencing device 304 may receive the input 312 from the client device 302 via the network 308, the client device 306 via the network 310, the platform component 326 (e.g., a touchscreen as a text command or microphone as a voice command), the memory 320, the storage medium 322 or the data repository 316. The inferencing device 304 may send the output 314 to the client device 302 via the network 308, the client device 306 via the network 310, the platform component 326 (e.g., a touchscreen to present text, graphic or video information or speaker to reproduce audio information), the memory 320, the storage medium 322 or the data repository 316. Examples for the software elements and hardware elements of the network 308 and the network 310 are described in more detail with reference to a communications architecture 2000 as depicted in FIG. 20. Embodiments are not limited to these examples.

The inferencing device 304 may include ML logic 328 and an ML model 330 to implement various AI/ML techniques for various AI/ML tasks. The ML logic 328 may receive the input 312 and process the input 312 using the ML model 330. The ML model 330 may perform inferencing operations to generate an inference for a specific task from the input 312. In some embodiments, the inference is part of the output 314. The output 314 may be used by the client device 302, the inferencing device 304, or the client device 306 to perform subsequent actions in response to the output 314.

In some embodiments, the ML model 330 may be a trained ML model 330 using a set of training operations. An example of training operations to train the ML model 330 is described with reference to FIG. 4.

Figure 4:
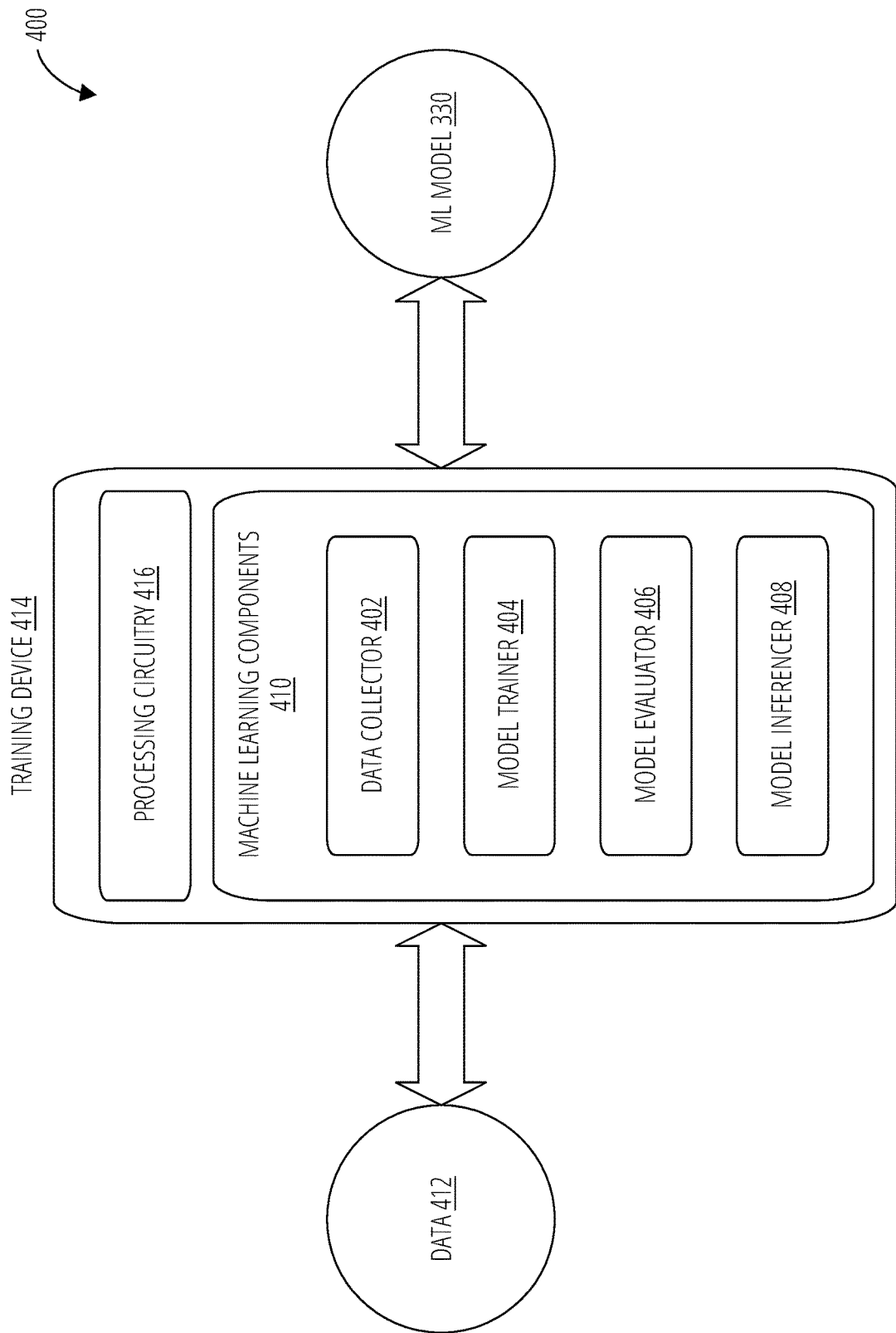
FIG. 4 illustrates an example apparatus that may include a training device suitable to generate a trained ML model for the inferencing device of the system shown in FIG. 3.

FIG. 4 illustrates an example apparatus 400 that may include a training device 414 suitable to generate a trained ML model 330 for the inferencing device 304 of the system 300. As shown in FIG. 4, the training device 414 may include a processing circuitry 416 and a set of ML components 410 to support various AI/ML techniques, such as a data collector 402, a model trainer 404, a model evaluator 406 and a model inferencer 408.

In general, the data collector 402 may collect data 412 from one or more data sources to use as training data for the ML model 330. The data collector 402 may collect different types of data 412, such as, text information, audio information, image information, video information, graphic information, and so forth. The model trainer 404 may receive as input the collected data and uses a portion of the collected data as test data for an AI/ML algorithm to train the ML model 330. The model evaluator 406 may evaluate and improve the trained ML model 330 using a portion of the collected data as test data to test the ML model 330. The model evaluator 406 may also use feedback information from the deployed ML model 330. The model inferencer 408 may implement the trained ML model 330 to receive as input new unseen data, generate one or more inferences on the new data, and output a result such as an alert, a recommendation or other post-solution activity.

An exemplary AI/ML architecture for the ML components 410 is described in more detail with reference to FIG. 5.

FIG. 5 illustrates an artificial intelligence architecture 500 that may be used by the training device 414 to generate the ML model 330 (e.g., one or more models that may be used by the benchmarking dataset generation engine 150 for generation of queries/questions/keywords, embeddings, etc. as related to electronic documents received from data sources 202, 204, etc.) for deployment by the inferencing device 304. The artificial intelligence architecture 500 is an example of a system suitable for implementing various AI techniques and/or ML techniques to perform various inferencing tasks on behalf of the various devices of the system 100.

AI is a science and technology based on principles of cognitive science, computer science and other related disciplines, which deals with the creation of intelligent machines that work and react like humans. AI is used to develop systems that can perform tasks that require human intelligence such as recognizing speech, vision and making decisions. AI can be seen as the ability for a machine or computer to think and learn, rather than just following instructions. ML is a subset of AI that uses algorithms to enable machines to learn from existing data and generate insights or predictions from that data. ML algorithms are used to optimize machine performance in various tasks such as classifying, clustering and forecasting. ML algorithms are used to create ML models that can accurately predict outcomes.

In general, the artificial intelligence architecture 500 may include various machine or computer components (e.g., circuit, processor circuit, memory, network interfaces, compute platforms, input/output (I/O) devices, etc.) for an AI/ML system that are designed to work together to create a pipeline that can take in raw data, process it, train an ML model 330, evaluate performance of the trained ML model 330, and deploy the tested ML model 330 as the trained ML model 330 in a production environment, and continuously monitor and maintain it.

The ML model 330 may be a mathematical construct used to predict outcomes based on a set of input data. The ML model 330 may be trained using large volumes of training data 526, and it can recognize patterns and trends in the training data 526 to make accurate predictions. The ML model 330 may be derived from an ML algorithm 524 (e.g., a neural network, decision tree, support vector machine, etc.). A data set is fed into the ML algorithm 524 which trains an ML model 330 to "learn" a function that produces mappings between a set of inputs and a set of outputs with a reasonably high accuracy. Given a sufficiently large enough set of inputs and outputs, the ML algorithm 524 may find the function for a given task. This function may even be able to produce the correct output for input that it has not seen during training. A data scientist prepares the mappings, selects and tunes the ML algorithm 524, and evaluates the resulting model performance. Once the ML logic 328 is sufficiently accurate on test data, it can be deployed for production use.

The ML algorithm 524 may include any ML algorithm suitable for a given AI task. Examples of ML algorithms may include supervised algorithms, unsupervised algorithms, or semi-supervised algorithms.

A supervised algorithm is a type of machine learning algorithm that uses labeled data to train a machine learning model. In supervised learning, the machine learning algorithm is given a set of input data and corresponding output data, which are used to train the model to make predictions or classifications. The input data is also known as the features, and the output data is known as the target or label. The goal of a supervised algorithm is to learn the relationship between the input features and the target labels, so that it can make accurate predictions or classifications for new, unseen data. Examples of supervised learning algorithms include: (1) linear regression which is a regression algorithm used to predict continuous numeric values, such as stock prices or temperature; (2) logistic regression which is a classification algorithm used to predict binary outcomes, such as whether a customer will purchase or not purchase a product; (3) decision tree which is a classification algorithm used to predict categorical outcomes by creating a decision tree based on the input features; or (4) random forest which is an ensemble algorithm that combines multiple decision trees to make more accurate predictions.

An unsupervised algorithm is a type of machine learning algorithm that is used to find patterns and relationships in a dataset without the need for labeled data. Unlike supervised learning, where the algorithm is provided with labeled training data and learns to make predictions based on that data, unsupervised learning works with unlabeled data and seeks to identify underlying structures or patterns. Unsupervised learning algorithms use a variety of techniques to discover patterns in the data, such as clustering, anomaly detection, and dimensionality reduction. Clustering algorithms group similar data points together, while anomaly detection algorithms identify unusual or unexpected data points. Dimensionality reduction algorithms are used to reduce the number of features in a dataset, making it easier to analyze and visualize. Unsupervised learning has many applications, such as in data mining, pattern recognition, and recommendation systems. It is particularly useful for tasks where labeled data is scarce or difficult to obtain, and where the goal is to gain insights and understanding from the data itself rather than to make predictions based on it.

Semi-supervised learning is a type of machine learning algorithm that combines both labeled and unlabeled data to improve the accuracy of predictions or classifications. In this approach, the algorithm is trained on a small amount of labeled data and a much larger amount of unlabeled data. The main idea behind semi-supervised learning is that labeled data is often scarce and expensive to obtain, whereas unlabeled data is abundant and easy to collect. By leveraging both types of data, semi-supervised learning can achieve higher accuracy and better generalization than either supervised or unsupervised learning alone. In semi-supervised learning, the algorithm first uses the labeled data to learn the underlying structure of the problem. It then uses this knowledge to identify patterns and relationships in the unlabeled data, and to make predictions or classifications based on these patterns. Semi-supervised learning has many applications, such as in speech recognition, natural language processing, and computer vision. It is particularly useful for tasks where labeled data is expensive or time-consuming to obtain, and where the goal is to improve the accuracy of predictions or classifications by leveraging large amounts of unlabeled data.

The ML algorithm 524 of the artificial intelligence architecture 500 is implemented using various types of ML algorithms including supervised algorithms, unsupervised algorithms, semi-supervised algorithms, or a combination thereof. A few examples of ML algorithms include support vector machine (SVM), random forests, naive Bayes, K-means clustering, neural networks, and so forth. A SVM is an algorithm that can be used for both classification and regression problems. It works by finding an optimal hyperplane that maximizes the margin between the two classes. Random forests is a type of decision tree algorithm that is used to make predictions based on a set of randomly selected features. Naive Bayes is a probabilistic classifier that makes predictions based on the probability of certain events occurring. K-Means Clustering is an unsupervised learning algorithm that groups data points into clusters. Neural networks is a type of machine learning algorithm that is designed to mimic the behavior of neurons in the human brain. Other examples of ML algorithms include a support vector machine (SVM) algorithm, a random forest algorithm, a naive Bayes algorithm, a K-means clustering algorithm, a neural network algorithm, an artificial neural network (ANN) algorithm, a convolutional neural network (CNN) algorithm, a recurrent neural network (RNN) algorithm, a long short-term memory (LSTM) algorithm, a deep learning algorithm, a decision tree learning algorithm, a regression analysis algorithm, a Bayesian network algorithm, a genetic algorithm, a federated learning algorithm, a distributed artificial intelligence algorithm, and so forth. Embodiments are not limited in this context.

As depicted in FIG. 5, the artificial intelligence architecture 500 includes a set of data sources 502 to source data 504 for the artificial intelligence architecture 500. Data sources 502 may comprise any device capable generating, processing, storing or managing data 504 suitable for a ML system. The data sources 502 may be received data 550 associated with documents (e.g., type of documents, portion(s) of document content(s) and/or entire contents of document(s), transactions data (e.g., type of transaction, transaction identifier, requests associated with the transaction, etc.), and/or any other data. It should be noted that the data 550 may also be supplied during training phase of the model. Some additional, non-limiting, examples of data sources 502 include without limitation databases, web scraping, sensors and Internet of Things (IoT) devices, image and video cameras, audio devices, text generators, publicly available databases, private databases, and many other data sources 502. The data sources 502 may be remote from the artificial intelligence architecture 500 and accessed via a network, local to the artificial intelligence architecture 500 an accessed via a network interface or may be a combination of local and remote data sources 502.

The data sources 502 source difference types of data 504 (which may include data 550 related to documents, transactions, etc.). By way of example and not limitation, the data 504 includes structured data from relational databases, such as customer profiles, transaction histories, or product inventories. The data 504 includes unstructured data from websites such as customer reviews, news articles, social media posts, or product specifications. The data 504 includes data from temperature sensors, motion detectors, and smart home appliances. The data 504 includes image data from medical images, security footage, or satellite images. The data 504 includes audio data from speech recognition, music recognition, or call centers. The data 504 includes text data from emails, chat logs, customer feedback, news articles or social media posts. The data 504 includes publicly available datasets such as those from government agencies, academic institutions, or research organizations. These are just a few examples of the many sources of data that can be used for ML systems. It is important to note that the quality and quantity of the data is critical for the success of a machine learning project.

The data 504 is typically in different formats such as structured, unstructured or semi-structured data. Structured data refers to data that is organized in a specific format or schema, such as tables or spreadsheets. Structured data has a well-defined set of rules that dictate how the data should be organized and represented, including the data types and relationships between data elements. Unstructured data refers to any data that does not have a predefined or organized format or schema. Unlike structured data, which is organized in a specific way, unstructured data can take various forms, such as text, images, audio, or video. Unstructured data can come from a variety of sources, including social media, emails, sensor data, and website content. Semi-structured data is a type of data that does not fit neatly into the traditional categories of structured and unstructured data. It has some structure but does not conform to the rigid structure of a traditional relational database. Semi-structured data is characterized by the presence of tags or metadata that provide some structure and context for the data.

The data sources 502 may be communicatively coupled to a data collector 402. The data collector 402 may gather relevant data 504 from the data sources 502. Once collected, the data collector 402 may use a pre-processor 506 to make the data 504 suitable for analysis. This may involve data cleaning, transformation, and feature engineering. Data pre-processing is a critical step in ML as it directly impacts the accuracy and effectiveness of the ML model 330. The pre-processor 506 receives the data 504 as input, processes the data 504, and outputs pre-processed data 516 for storage in a database 508. Examples for the database 508 includes a hard drive, solid state storage, and/or random-access memory (RAM).

The data collector 402 is communicatively coupled to a model trainer 404. The model trainer 404 may perform AI/ML model training, validation, and testing which may generate model performance metrics as part of the model testing procedure. The model trainer 404 may receive the pre-processed data 516 as input 510 or via the database 508.

The model trainer 404 may implement a suitable ML algorithm 524 to train an ML model 330 on a set of training data 526 from the pre-processed data 516. The training process may involve feeding the pre-processed data 516 into the ML algorithm 524 to produce or optimize an ML model 330. The training process may adjust its parameters until it achieves an initial level of satisfactory performance.

The model trainer 404 may be communicatively coupled to a model evaluator 406. After an ML model 330 is trained, the ML model 330 may need to be evaluated to assess its performance. This is done using various metrics such as accuracy, precision, recall, and F1 score. The model trainer 404 may output the ML model 330, which is received as input 510 or from the database 508. The model evaluator 406 may receive the ML model 330 as input 512, and it initiates an evaluation process to measure performance of the ML model 330. The evaluation process may include providing feedback 518 to the model trainer 404. The model trainer 404 may re-train the ML model 330 to improve performance in an iterative manner.

The model evaluator 406 may be communicatively coupled to the model inferencer 408. The model inferencer 408 may provide AI/ML model inference output (e.g., inferences, predictions or decisions). Once the ML model 330 is trained and evaluated, it may be deployed in a production environment where it is used to make predictions on new data. The model inferencer 408 may receive the evaluated ML model 330 as input 514. The model inferencer 408 may use the evaluated ML model 330 to produce insights or predictions on real data, which may be deployed as a final production ML model 330. The inference output of the ML model 330 may be use case specific. The model inferencer 408 may also perform model monitoring and maintenance, which involves continuously monitoring performance of the ML model 330 in the production environment and making any necessary updates or modifications to maintain its accuracy and effectiveness. The model inferencer 408 may provide feedback 518 to the data collector 402 to train or re-train the ML model 330. The feedback 518 may include model performance feedback information, which may be used for monitoring and improving performance of the ML model 330.

Some or all of the model inferencer 408 may be implemented by various actors 522 in the artificial intelligence architecture 500, including the ML model 330 of the inferencing device 304, for example. The actors 522 may use the deployed ML model 330 on new data to make inferences or predictions for a given task and output an insight 532. The actors 522 may implement the model inferencer 408 locally, or remotely receives outputs from the model inferencer 408 in a distributed computing manner. The actors 522 may trigger actions directed to other entities or to itself. The actors 522 provide feedback 520 to the data collector 402 via the model inferencer 408. The feedback 520 may include data needed to derive training data, inference data or to monitor the performance of the ML model 330 and its impact to the network through updating of key performance indicators (KPIs) and performance counters.

As discussed above, the systems 100, 300 implement some or all of the artificial intelligence architecture 500 to support various use cases and solutions for various AI/ML tasks. In some embodiments, the training device 414 of the apparatus 400 may use the artificial intelligence architecture 500 to generate and train the ML model 330 for use by the inferencing device 304 for the system 100. In one embodiment, for example, the training device 414 may train the ML model 330 as a neural network, as described in more detail with reference to FIG. 6. Other use cases and solutions for AI/ML are possible as well, and embodiments are not limited in this context.

Figure 6:
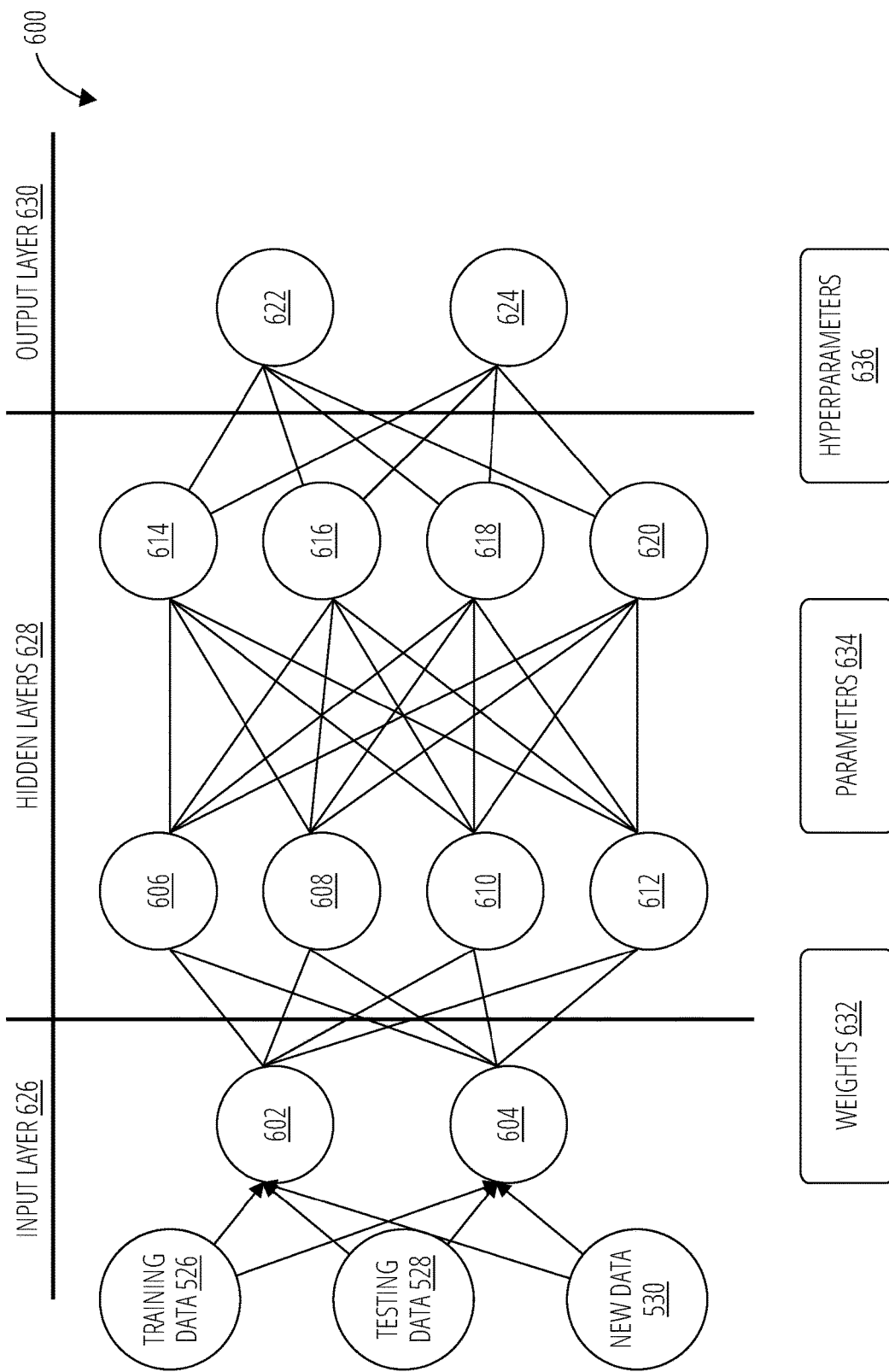
FIG. 6 illustrates an artificial neural network in accordance with one embodiment.

FIG. 6 illustrates an embodiment of an artificial neural network 600. Neural networks, also known as artificial neural networks (ANNs) or simulated neural networks (SNNs), are a subset of machine learning and are at the core of deep learning algorithms. Their name and structure are inspired by the human brain, mimicking the way that biological neurons signal to one another.

Artificial neural network 600 may include multiple node layers, containing an input layer 626, one or more hidden layers 628, and an output layer 630. Each layer comprises one or more nodes, such as nodes 602 to 624. As shown in FIG. 6, for example, the input layer 626 may include nodes 602, 604. The artificial neural network 600 may include two hidden layers 628, with a first hidden layer having nodes 606, 608, 610 and 612, and a second hidden layer having nodes 614, 616, 618 and 620. The artificial neural network 600 may include an output layer 630 with nodes 622, 624. Each node 602 to 624 may include a processing element (PE), or artificial neuron, that connects to another and has an associated weight and threshold. If the output of any individual node is above the specified threshold value, that node may be activated, sending data to the next layer of the network. Otherwise, no data is passed along to the next layer of the network.

In general, artificial neural network 600 may rely on training data 526 to learn and improve accuracy over time. However, once the artificial neural network 600 may be fine-tuned for accuracy, and tested on testing data 528, the artificial neural network 600 may be ready to classify and cluster new data 530 at a high velocity. Tasks in speech recognition or image recognition can take minutes versus hours when compared to the manual identification by human experts.

Each individual node 602 to 424 may be a linear regression model, composed of input data, weights, a bias (or threshold), and an output. The linear regression model may have a formula similar to Equation (1), as follows:

$$\sum wixi + \text{bias} = w1x1 + w2x2 + w3x3 + \text{bias} \quad \text{EQUATION (1)}$$
$$\text{output} = f(x) = 1 \text{ if } \sum w1x1 + b >= 0; 0 \text{ if } \sum w1x1 + b < 0$$

Once an input layer 626 is determined, a set of weights 632 may be assigned. The weights 632 help determine the importance of any given variable, with larger ones contributing more significantly to the output compared to other inputs. All inputs are then multiplied by their respective weights and then summed. Afterward, the output is passed through an activation function, which determines the output. If that output exceeds a given threshold, it "fires" (or activates) the node, passing data to the next layer in the network. This results in the output of one node becoming in the input of the next node. The process of passing data from one layer to the next layer defines the artificial neural network 600 as a feedforward network.

In some embodiments, the artificial neural network 600 may leverage sigmoid neurons, which are distinguished by having values between 0 and 1. Since the artificial neural network 600 behaves similarly to a decision tree, cascading data from one node to another, having x values between 0 and 1 will reduce the impact of any given change of a single variable on the output of any given node, and subsequently, the output of the artificial neural network 600.

The artificial neural network 600 may have many practical use cases, like image recognition, speech recognition, text recognition or classification. The artificial neural network 600 leverages supervised learning, or labeled datasets, to train the algorithm. As the model is trained, its accuracy is measured using a cost (or loss) function. This is also commonly referred to as the mean squared error (MSE). An example of a cost function is shown in Equation (2), as follows:

$$\text{Cost Function} = MSE = \frac{1}{2m}\sum_{i=1}^{m}(\hat{y}_i - y_i)^2 \rightarrow \text{MIN} \quad \text{EQUATION (2)}$$

Where i represents the index of the sample, y-hat is the predicted outcome, y is the actual value, and m is the number of samples.

Ultimately, the goal is to minimize the cost function to ensure correctness of fit for any given observation. As the model adjusts its weights and bias, it uses the cost function and reinforcement learning to reach the point of convergence, or the local minimum. The process in which the algorithm adjusts its weights is through gradient descent, allowing the model to determine the direction to take to reduce errors (or minimize the cost function). With each training example, the parameters 634 of the model adjust to gradually converge at the minimum.

In one embodiment, the artificial neural network 600 is feedforward, meaning it flows in one direction only, from input to output. In one embodiment, the artificial neural network 600 uses backpropagation. Backpropagation is when the artificial neural network 600 moves in the opposite direction from output to input. Backpropagation allows calculation and attribution of errors associated with each neuron 602 to 624, thereby allowing adjustment to fit the parameters 634 of the ML model 330 appropriately.

The artificial neural network 600 is implemented as different neural networks depending on a given task. Neural networks are classified into different types, which are used for different purposes. In one embodiment, the artificial neural network 600 is implemented as a feedforward neural network, or multi-layer perceptrons (MLPs), comprised of an input layer 626, hidden layers 628, and an output layer 630. While these neural networks are also commonly referred to as MLPs, they are actually comprised of sigmoid neurons, not perceptrons, as most real-world problems are nonlinear. Trained data 504 usually is fed into these models to train them, and they are the foundation for computer vision, natural language processing, and other neural networks. In one embodiment, the artificial neural network 600 is implemented as a convolutional neural network (CNN). A CNN is similar to feedforward networks, but usually utilized for image recognition, pattern recognition, and/or computer vision. These networks harness principles from linear algebra, particularly matrix multiplication, to identify patterns within an image. In one embodiment, the artificial neural network 600 is implemented as a recurrent neural network (RNN). A RNN is identified by feedback loops. The RNN learning algorithms are primarily leveraged when using time-series data to make predictions about future outcomes, such as stock market predictions or sales forecasting. The artificial neural network 600 is implemented as any type of neural network suitable for a given operational task of system 100, and the MLP, CNN, and RNN are merely a few examples. Embodiments are not limited in this context.

The artificial neural network 600 may include a set of associated parameters 634. There are a number of different parameters that must be decided upon when designing a neural network. Among these parameters are the number of layers, the number of neurons per layer, the number of training iterations, and so forth. Some of the more important parameters in terms of training and network capacity are a number of hidden neurons parameter, a learning rate parameter, a momentum parameter, a training type parameter, an Epoch parameter, a minimum error parameter, and so forth.

In some embodiments, the artificial neural network 600 may be implemented as a deep learning neural network. The term deep learning neural network refers to a depth of layers in a given neural network. A neural network that has more than three layers—which would be inclusive of the inputs and the output—can be considered a deep learning algorithm. A neural network that only has two or three layers, however, may be referred to as a basic neural network. A deep learning neural network may tune and optimize one or more hyperparameters 636. A hyperparameter is a parameter whose values are set before starting the model training process. Deep learning models, including convolutional neural network (CNN) and recurrent neural network (RNN) models can have anywhere from a few hyperparameters to a few hundred hyperparameters. The values specified for these hyperparameters impacts the model learning rate and other regulations during the training process as well as final model performance. A deep learning neural network uses hyperparameter optimization algorithms to automatically optimize models. The algorithms used include Random Search, Tree-structured Parzen Estimator (TPE) and Bayesian optimization based on the Gaussian process. These algorithms are combined with a distributed training engine for quick parallel searching of the optimal hyperparameter values.

FIG. 7 illustrates an example of a document corpus 708 suitable for use by the benchmarking dataset generation engine 150 of the server device 102. The document corpus 708 may be stored in one or more database and/or storage locations and may be accessible (e.g., via a query) by the benchmarking dataset generation engine 150. In general, a document corpus is a large and structured collection of electronic documents, such as text documents, that are typically used for natural language processing (NLP) tasks such as text classification, sentiment analysis, topic modeling, and information retrieval. A corpus can include a variety of document types such as web pages, books, news articles, social media posts, scientific papers, and more. The corpus may be created for a specific domain or purpose, and it may be annotated with metadata or labels to facilitate analysis. Document corpora are commonly used in research and industry to train machine learning models and to develop NLP applications.

As shown in FIG. 7, the document corpus 708 may include information from electronic documents 718 derived from the document records 138 stored in the data store 126. The electronic documents 718 may include any electronic document having metadata such as STME 132 suitable for receiving an electronic signature, including both signed electronic documents or unsigned electronic documents. Different sets of the electronic documents 718 of the document corpus 708 may be associated with different entities. For example, a first set of electronic documents 718 is associated with a company A 702. A second set of electronic documents 718 is associated with a company B 704. A third set of electronic documents 718 is associated with a company C 706. A fourth set of electronic documents 718 is associated with a company D 710. Although some embodiments discuss the document corpus 708 having electronic documents 718, it may be appreciated that the document corpus 708 may have unsigned electronic document as well, which may be mined using the AI/ML techniques described herein. Embodiments are not limited in this context.

Each set of electronic documents 718 associated with a defined entity may include one or more subsets of the electronic documents 718 categorized by document type. For instance, the second set of electronic documents 718 associated with company B 704 may have a first subset of electronic documents 718 with a document type for supply agreements 712, a second subset of electronic documents 718 with a document type for lease agreements 716, and a third subset of electronic documents 718 with a document type for service agreements 714. In one embodiment, the sets and subsets of electronic documents 718 may be identified using labels manually assigned by a human operator, such as metadata added to a document record for a signed electronic document created in a document management system, or feedback from a user of the system 100 during a document generation process. In one embodiment, the sets and subsets of electronic documents 718 may be unlabeled.

Figure 8:
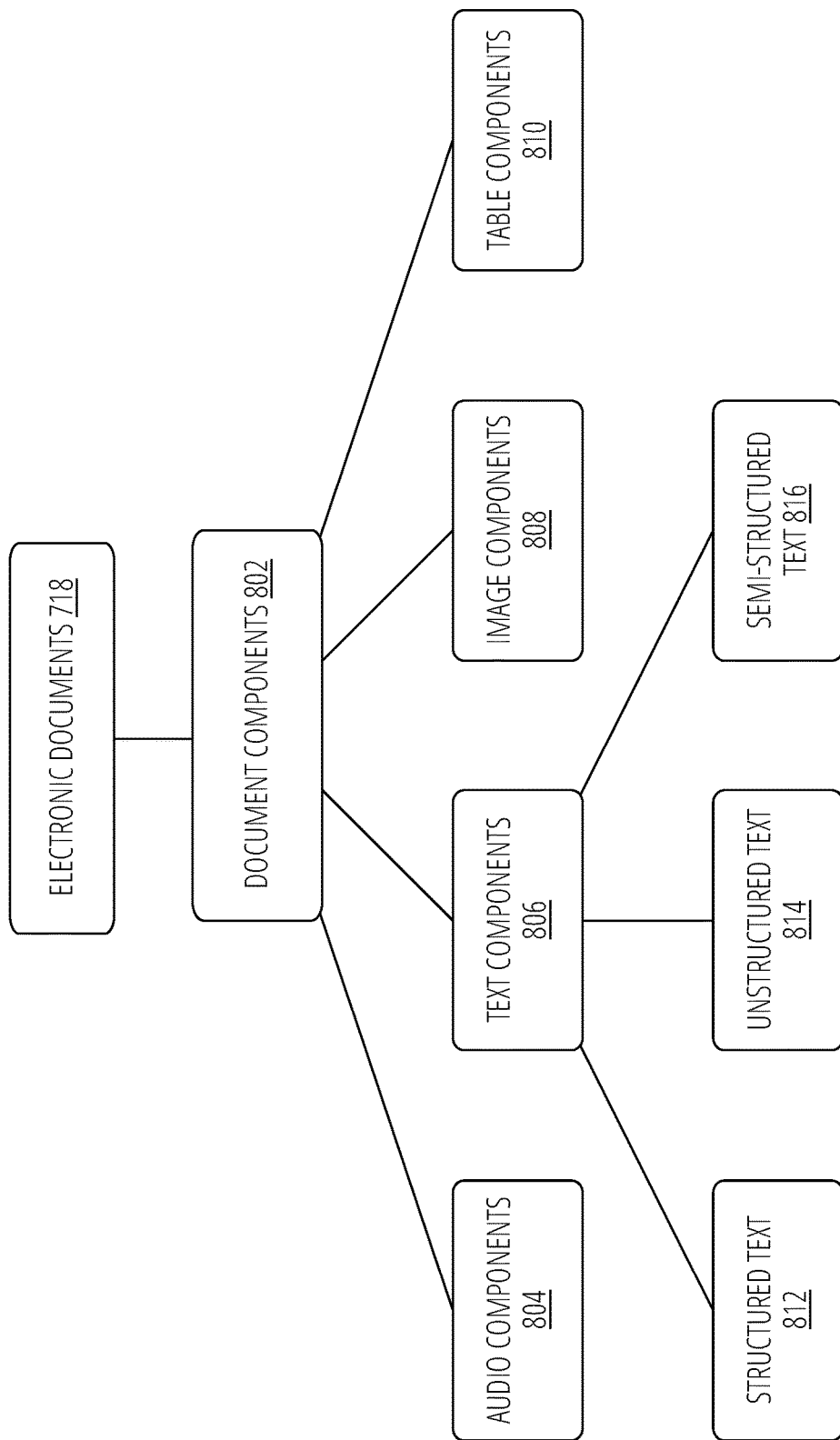
FIG. 8 illustrates electronic documents in accordance with one embodiment.

FIG. 8 illustrates an example of an electronic document 718. An electronic document 718 may include different information types that collectively form a set of document components 802 for the electronic document 718. The document components 802 may comprise, for example, one or more audio components 804, text components 806, image components 808, or table components 810. Each document component 802 may comprise different content types. For example, the text components 806 may comprise structured text 812, unstructured text 814, or semi-structured text 816.

Structured text 812 refers to text information that is organized in a specific format or schema, such as words, sentences, paragraphs, sections, clauses, and so forth. Structured text 812 has a well-defined set of rules that dictate how the data should be organized and represented, including the data types and relationships between data elements.

Unstructured text 814 refers to text information that does not have a predefined or organized format or schema. Unlike structured text 812, which is organized in a specific way, unstructured text 814 can take various forms, such as text information stored in a table, spreadsheet, figures, equations, header, footer, filename, metadata, and so forth.

Semi-structured text 816 is text information that does not fit neatly into the traditional categories of structured and unstructured data. It has some structure but does not conform to the rigid structure of a specific format or schema. Semi-structured data is characterized by the presence of context tags or metadata that provide some structure and context for the text information, such as a caption or description of a figure, name of a table, labels for equations, and so forth.

Figure 9:
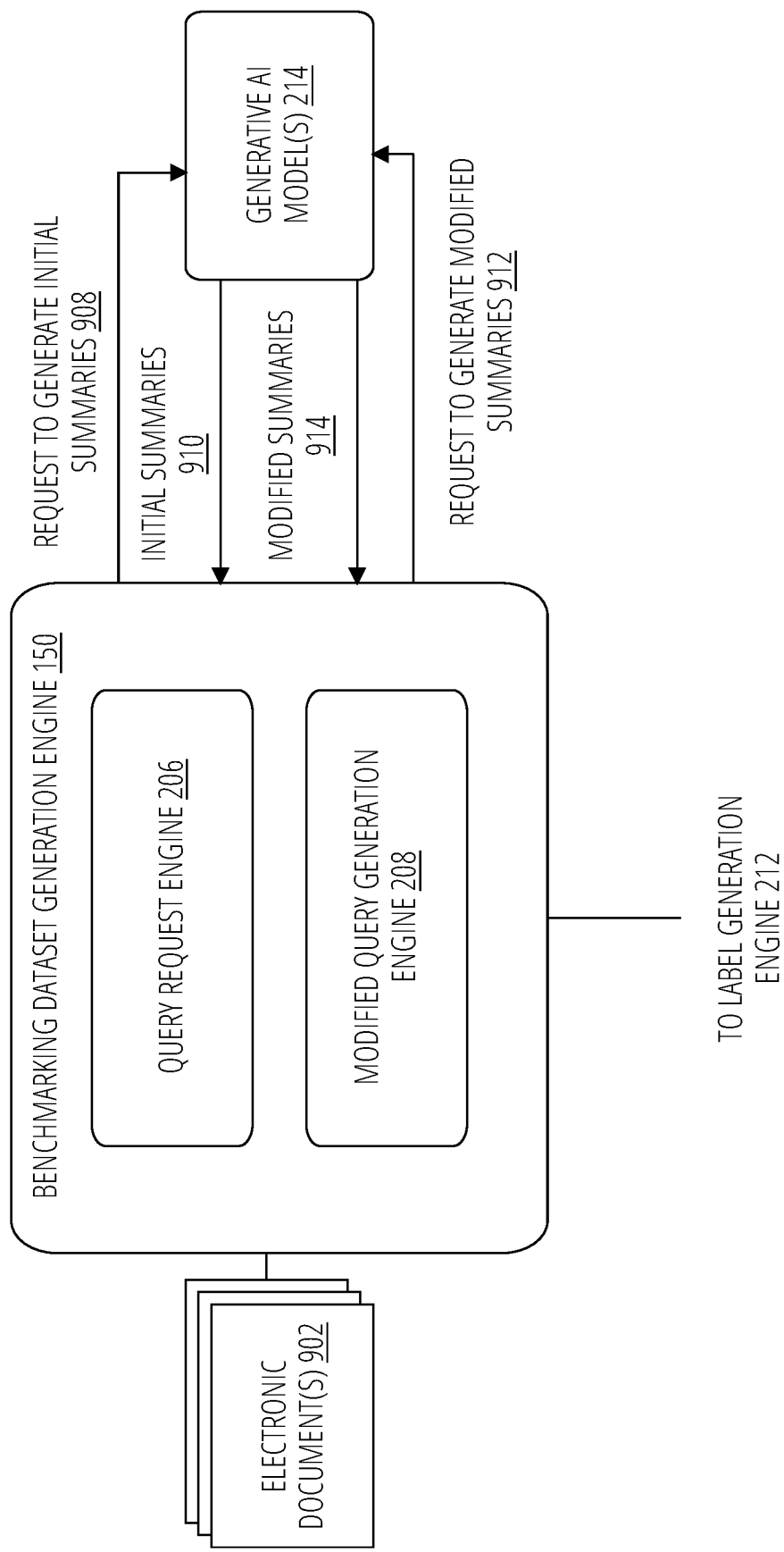
FIG. 9 illustrates an example of operation of the query request engine and modified query generation engine, according to some embodiments of the current subject matter.

FIG. 9 illustrates an example of operation of the query request engine 206 and modified query generation engine 208, according to some embodiments of the current subject matter. The query request engine 206 may be configured to receive one or more electronic document(s) 902 from one or more data sources, e.g., data sources 202, 204, as shown in FIG. 2. The electronic document(s) 902 may be unprocessed (e.g., as stored in data source 204) and/or processed (e.g., as stored in data source 202). Alternatively, or in addition, the modified query generation engine 208 may receive the electronic document(s) 902 from one or more of the data sources 202, 204. The engine 208 may also receive one or more document parameters 210 that may be used to modify requests to the generative AI model(s) 214 for generation of document summaries. Moreover, the engine 208 may be configured to modify requests or queries generated by the engine 206 using document parameters 210. As can be understood, one or both engines 206, 208 may be configured to generate and submit requests to the generative AI model(s) 214 for generation of summaries of electronic document(s) and/or any portions thereof.

Upon receiving of the electronic document(s) 902, the engine 206 may be configured to analyze the documents and generate one or more request(s) to generate initial questions/queries 908 for submission to the generative AI model(s) 214 so that one or more summaries may be generated by the model(s) 214. The analysis performed by the engine 206 may involve determination of a type of electronic document (e.g., a lease agreement, a master services agreement, etc.), a source of the document (e.g., public databases, private databases, etc.), one or more entities involved in the document (e.g., parties to the agreement, etc.), and/or any other information. This way, the query/request that the engine 206 may generate to the generative AI model(s) 214 may be result in more accurate summaries that may be received from the generative AI model(s) 214. In some embodiments, the engine 206 may execute one or more machine learning models to retrieve the information that it needs to generate the request to generate initial summaries 908 to the generative AI model(s) 214.

The request 908 may be in any desired form, language, format, etc. For example, the request may be formatted using natural language processing. Alternatively, or in addition, a query language (e.g., SQL, etc.) may be used to form the request 908 and transmit it to the generative AI model(s) 214. The request may specify how (e.g., format, size, type of response, etc.) the engine 908 wishes to receive a response from the generative AI model(s) 214 and/or any information that may be associated with the response. For example, the request 908 may state: "Generate a summary of the lease agreement. Provide short, medium and long summaries." The request 908 may include the electronic document 902 for which the generative AI model(s) 214 is being asked to generate a summary. As stated above, the generative AI models 214 may be part of the current subject matter system (e.g., system 200 shown in FIG. 2) and/or be one or more third party models (e.g., ChatGPT, Bard, DALL-E, Midjourney, DeepMind, etc.).

Once the generative AI model(s) 214 receives the request 908, it may perform any analysis that may typically be performed by a generative AI model and respond with initial summaries 910 that may be sent back to the query request engine 206, and/or to the modified query generation engine 208. Upon receiving the initial summaries 910, the engine 208 may be configured to generate a request to generate modified summaries 912, which may be a modified version of the request 908, where the request 908 may be modified using one or more parameters associated with the electronic document (e.g., a type of the document, a length of the document, etc.). The engine 208 may be configured to generate request 912 and provided it to the generative AI model(s) 214 to generate a modified summary/ies 914. The same or different generative AI model(s) 214 may be used for generation of responses 910 and 914. The request 912 may be sent with and/or without the electronic document(s) that was submitted as part of the request 908. Alternatively, or in addition, the electronic document(s) may be sent to the generative AI model(s) 214 together with the request 908 and/or 912. The received summary/ies 914 may then be provided to the engine label generation engine 212 to generate one or more labels.

Figure 10:
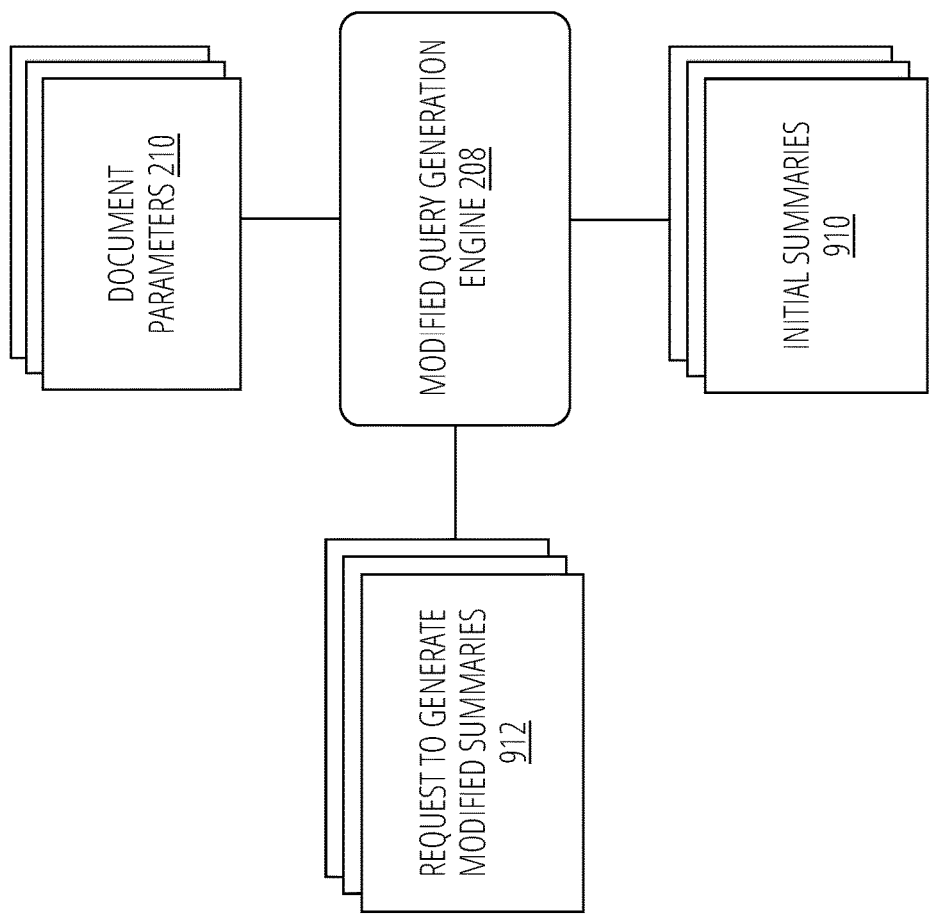
FIG. 10 illustrates an example operation of the modified query generation engine, according to some embodiments of the current subject matter.

FIG. 10 illustrates an example operation of the modified query generation engine 208, according to some embodiments of the current subject matter. The modified query generation engine 208 may be configured to receive one or more initial summaries 910 and one or more document parameters 210. Using the summaries 910 and document parameters 210, the engine 208 may be configured to generate one or more requests 912 to generate modified summaries and provide it to the generative AI model(s) 214 (not shown in FIG. 10).

To generate requests 912, the engine 208 may be configured to implement one or more document parameters 210. Alternatively, or in addition, the engine 208 may be configured to use one or more machine learning models for generation of modified requests 912. The models may be appropriately trained to generate modified requests 912 based on the document parameters 210 and initial summaries 910. The engine 208 may generate any number of requests 912 (e.g., a request to generate a short summary, a medium summary, a long summary, a summary of specific provision(s), etc.). The modified requests 912 may be specific to a particular electronic document 902, a set of documents, a portion of the document, and/or portions of one or more documents. Any summaries that may be generated by the models 214 as a result of receiving requests 912 (and/or 908) may be generated in any desired form, format, etc., and may include words, phrases, sentences, portions of the electronic documents 902, etc. The generated summaries 914 may be provided to the label generation engine 212 (as shown in FIG. 2) to generate one or more labels.

Figure 11:
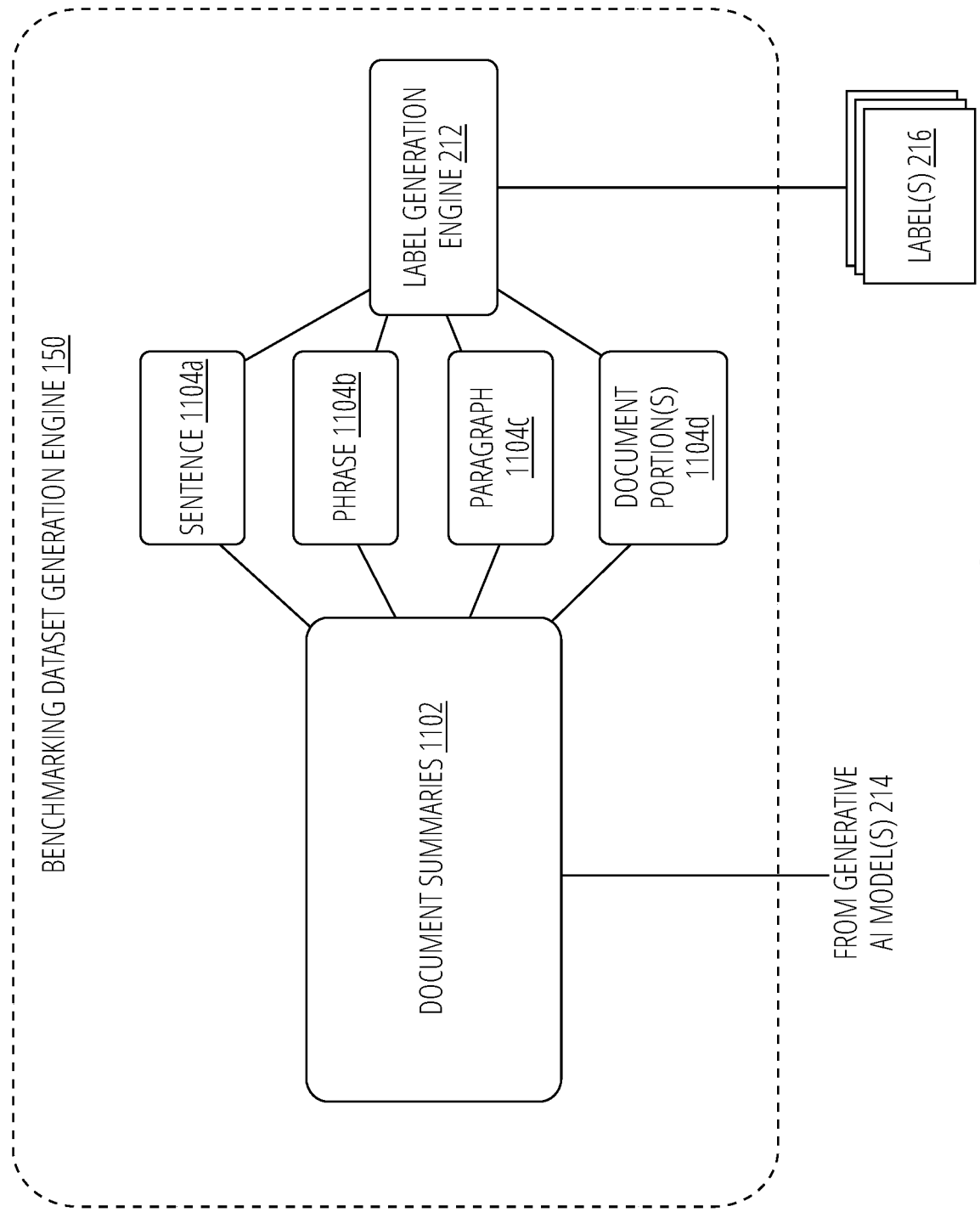
FIG. 11 illustrates an example process for generating one or more document label(s) based on document summaries generated by the generative AI model(s), according to some embodiments of the current subject matter.

FIG. 11 illustrates an example process for generating one or more document label(s) 216 based on document summaries generated by the generative AI model(s) 214, according to some embodiments of the current subject matter. As discussed herein, the label generation process may be executed by the benchmarking dataset generation engine 150. The engine 150 may be configured to receive one or more document summaries 1102 from the generative AI model(s) 214 as a result of operations executed by one or more of the query request engine 206 and modified query generation engine 208.

The engine 150 may then analyze the document summaries 1102 for the purposes of extracting data/information that may be used for generation of one or more labels. The engine 150 may use any machine learning models for extraction purposes. The machine learning models may be trained, re-trained, and/or refresh trained based on one or more previous extractions. In response to the analysis, the engine 150 may generate one or more sentences 1104a, phrases 1104b, paragraphs 1104c, and/or any other document portion(s) 1104d. For example, the engine 150 may extract a sentence 1104a stating "The term of this agreement is 1 year." which may be used as a label and/or used for generation of a label, e.g., "term". The engine 150 may generate a paragraph 1104c stating "This agreement shall be governed by the law of the State of California. Any disputes specifically related to non-payment shall be governed by the law of the State of New York." Again, this paragraph 1104c may be used in its entirety as a label and/or used to generate a label, e.g., "law". As can be understood, any other portions(s) 1104 of electronic documents may be generated.

To generate the labels, the portion(s) 1104 may be provided to the label generation engine 212. The label generation engine 212 may, in turn, use the portion(s) 1104 to generate one or more labels 216. The labels may be the portion(s) 1104 that have been generated and/or retrieved from the document summaries 1102. Alternatively, or in addition, the labels may be specific identifiers, terms, etc. that may be determined based on the retrieved portion(s) 1104. For example, for the response "The term of this agreement is 1 year.", the label generation engine 212 may generate a label "term" and/or "termination". As can be understood, any type of labels 216 may be generated by the label generation engine 212.

As discussed above in connection with FIG. 2, the generated label(s) 216 may be provided to the feedback engine 218, which may use semantic-similarity analysis, content-based analysis and/or subject matter analysis of the provided label(s) 216 to determine whether the label(s) 216 are acceptable or not. Moreover, the rule(s) engine 220 may generate one or more rules for reviewing the labels (e.g., label "term" is acceptable to label a portion of the document related to termination (e.g., "The term of this agreement is 1 year"), but it is not acceptable to label a portion of the document related to governing law). The rules may be used by the feedback engine 218 to review newly generated label(s) 216 by the label generation engine 212 and/or by additional feedback engine(s) 222 in reviewing label(s) 216 that have already been reviewed by the engine 218.

Once the feedback engine(s) 222 reviewed the labels using rules generated by the rule(s) engine 220, the engine(s) 222 may determine which labels are acceptable (e.g., accepted label(s) 224) and which should be discarded (e.g., rejected label(s) 226). In some embodiments, the accepted label(s) 224 may form a benchmarking dataset 228. The benchmarking dataset may be used to train and/or evaluate a large language model. The benchmarking dataset 228 may be specific to a particular model, particular type of electronic documents (e.g., lease agreements, sales agreements, etc.), etc. Alternatively, or in addition, the benchmarking dataset 228 may be model and/or electronic document agnostic, i.e., it may be used to evaluate any type of model and/or any type of electronic document. Further, the benchmarking dataset 228 may also include the rejected label(s) 226, which may indicate which labels are not to be used to label certain portions of electronic documents.

In some embodiments, the benchmarking dataset 228 may be used to train a machine learning model so that a ground truth summary may be generated by the trained model. The ground truth model may be used to assess other machine learning models (e.g., large language models, generative AI models, etc.) by comparing summaries generated by such machine learning models to the ground truth model, as discussed herein. Based on the comparison, an effectiveness and accuracy of the machine learning models may be determined.

Figure 12:
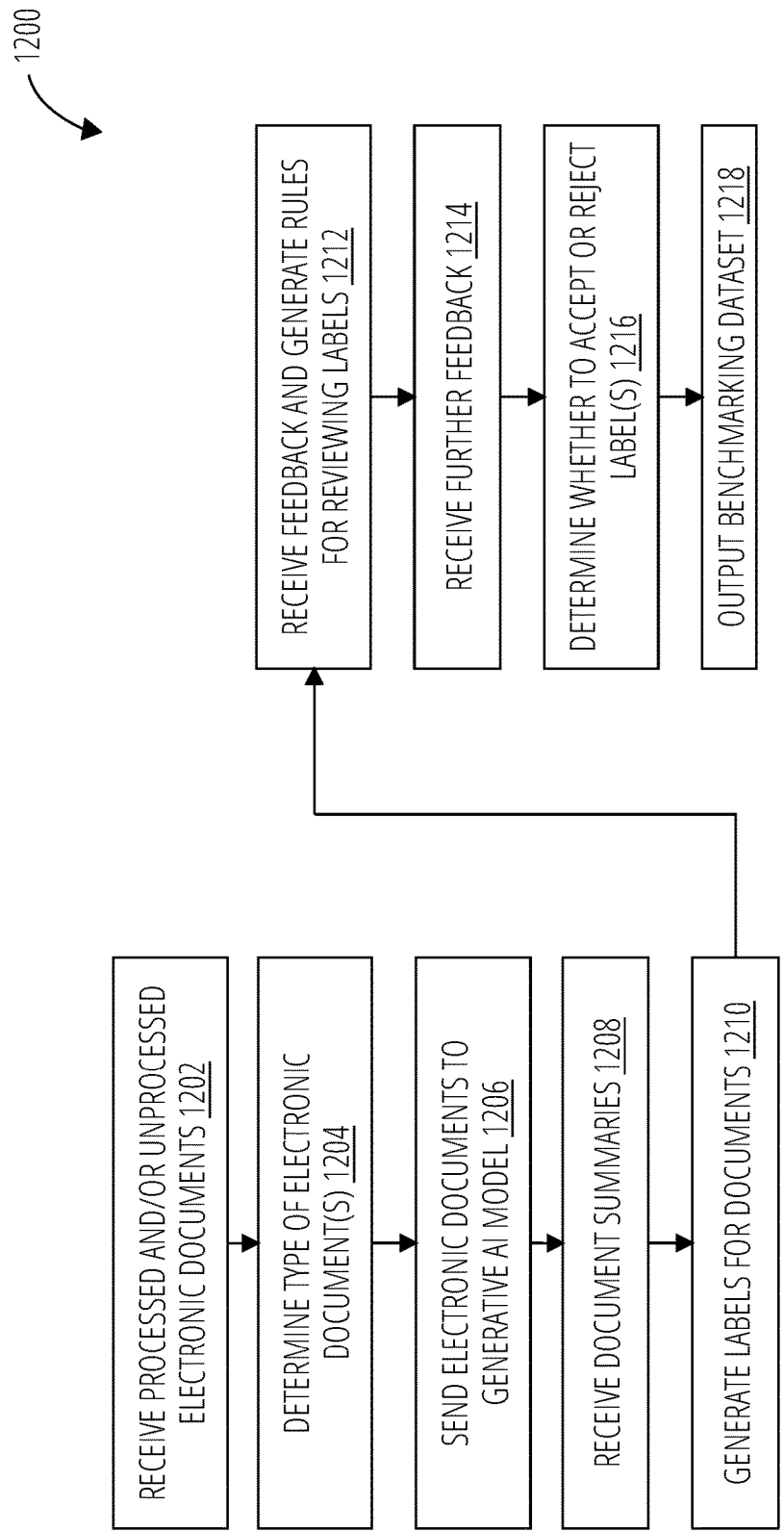
FIG. 12 illustrates an example process for generating a benchmarking dataset, according to some embodiments of the current subject matter.

FIG. 12 illustrates an example process 1200 for generating a benchmarking dataset 228, according to some embodiments of the current subject matter. In the process 1200, one or more operations 1202-1208 may be executed by the query request engine 206 and/or modified query generation engine 208, operation(s) 1210 may be executed by the label generation engine 212, and operation(s) 1212-1218 may be executed by feedback engines 218, 222, as shown in FIG. 2. One or more of operations 1202-1218 may be executed simultaneously (or substantially simultaneously) and/or one after the other. Moreover, operations 1202-1218 may be executed as soon as output of one or more sets of previously executed operations 1202-1218 is received and/or upon all operations 1202-1218 are completed, and/or in any other manner.

At 1202, the query request engine 206 may be configured to receive processed and/or unprocessed electronic documents. The documents may be received from one or more data sources 202 and/or 204. The query request engine 206 may optionally be configured to analyze the electronic documents to determine type of documents (e.g., lease agreements, sales agreements, etc.), at 1204. The query request engine 206 may form one or more requests to the generative AI model(s) 214 to generate one or more summaries of the electronic documents that it has analyzed. The request, along with the retrieved electronic document(s), may be sent to the generative AI model(s) 214, at 1206. Alternatively, or in addition, the modified query generation engine 208 may be configured to process electronic document(s) from sources 202 and/or 204 and generate similar requests to the generative AI model(s) 214 for generation of summaries of documents. The requests from engine 208 may be similar to the requests generated by the engine 206 but modified using one or more parameters associated with the electronic documents (e.g., type of document, length of document, entities referred to in the document, etc.). Further the requests from engine 208 may be generated in response to receiving a document summary from the generative AI model(s) 214 that has been generated as a result of a request from engine 206. Moreover, the engine 208 may modify the request initially generated by the engine 206, such as, for example, by using one or more parameters associated with the electronic document.

The generative AI model(s) 214 may ingest the request (e.g., request to generate summaries (908 and/or 912) and the electronic document(s) and execute analysis of the request and the document(s). In response to the analysis, the generative AI model(s) 214 may provide one or more document summaries to the query request engine 206, at 1208.

The summaries of electronic documents may be used by the label generation engine 212 to generate one or more label(s) 216, at 1210. The labels may be and/or may be generated based on alpha-numeric characters, words, sentences, phrases, paragraphs, and/or any other portions of electronic documents.

At 1212, the label(s) 216 may be reviewed by the feedback engine 218. The feedback engine 218 may execute a subject-matter review of the labels, e.g., analyze content of the label(s) 216, to determine whether label(s) 216 are properly labeling a particular portion of the electronic document(s). Further, one or more rules for reviewing labels may also be generated by the rule(s) engine 220. The rules may indicate whether a label is acceptable based on the content of the label and/or the content of the portion of electronic document to which it is assigned.

At 1214, further feedback on the label(s) 216 may be received as result of one or more feedback engine(s) 222 executing analysis of the label(s) 216. This analysis may be executed using rules generated by the rule(s) engine 220. The feedback engine(s) 222 may determine (upon an agreement) that a particular label 216 may be acceptable, thereby forming a set of accepted label(s) 224 and/or unacceptable, thereby forming a set of rejected label(s) 226, at 1216. One or more both of the accepted label(s) 224 and/or rejected label(s) 226 may form a benchmarking dataset 228, at 1218. As discussed herein, there benchmarking dataset 228 may be used to evaluate and/or train one or more large language models.

Figure 13:
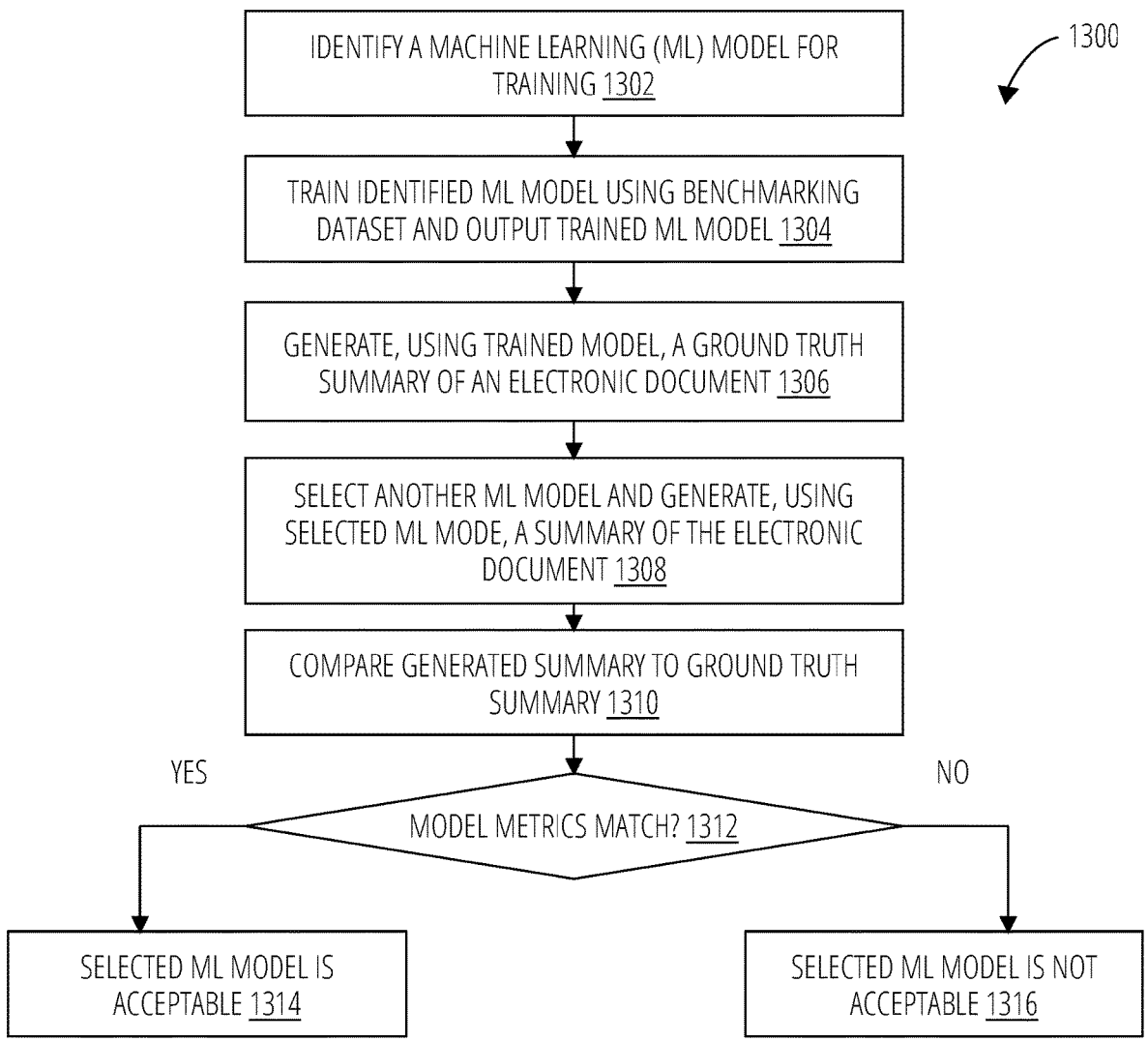
FIG. 13 illustrates an example process for evaluating one or more machine learning models using the generated benchmarking dataset, according to some embodiments of the current subject matter.

FIG. 13 illustrates an example process 1300 for evaluating one or more machine learning models using the generated benchmarking dataset 228, according to some embodiments of the current subject matter. The process 1300 may be executed by the server device 102 and/or any other computing device. The process 1300 may be configured to use one or more of the labels and/or summaries generated by the benchmarking dataset generation engine 150. In particular, the labels and/or summaries may be used to generate one or more template and/or ground truth summaries for an electronic document and/or documents and compare such ground truth summaries to summaries generated by other machine learning models of the same and/or different electronic documents. The machine learning models may be any type of large language models, generative AI models, and/or any other types of models that may be capable of executing summarization of electronic documents and/or portions thereof based on one or more inputs provided to them.

At 1302, the server device 102 may be configured to identify a machine learning (ML) model for training using the benchmarking dataset 228. As stated above, the identified ML model may be any type of large language model, generative AI model, and/or any other type of model. The identified model may be trained, at 1304, using the benchmarking dataset 228 that has been generated in accordance with the processes described herein. A trained ML model may be outputted as a result.

At 1306, one or more electronic documents may be retrieved (and/or received) from one or more sources 202, 204. The trained ML model may then be requested to generate a summary of such document(s). The ground truth summary may be set as a summary against which all other summaries of electronic documents may be compared. Moreover, the ground truth summary may also be included in the benchmarking dataset 228. One or more ground truth summaries may be generated. For example, one ground truth summary may be generated for a specific type of machine learning model, a type of document (e.g., a lease agreement, a sales agreement, etc.), a particular entity that may be involved with the agreement, and/or for any other reason. Thus, when analysis of a particular machine learning model may be required, a particular ground truth summary may be retrieved from a storage location and used for evaluation of effectiveness/accuracy of that model.

In some embodiments, several ground truth summaries may be generated by a particular trained ML model. For example, one ground truth summary may be a short ground truth summary (e.g., limited to a predetermined number of words, e.g., 90 words). Another ground truth summary may be a medium size ground truth summary (e.g., 125 words). Yet another ground truth summary may be a long ground truth summary (e.g., 175 words). Each of these ground truth summaries may then be used for comparison with like-size (and/or irrespective of size) summaries generated by other models to assess effectiveness/accuracy of such models when summarizing electronic documents.

At 1308, evaluation of another machine learning model (e.g., a large language model, a generative AI model, etc.) may be executed. The machine learning model may be selected from a plurality of machine learning models. The model may be requested to generate a summary of the electronic document that may have been used to generate the ground truth summary. The requests transmitted to such other machine learning model may be the same as those provided to the trained machine learning model. This way the models (i.e., the trained model and the selected model) are not provided with different requests, thereby enabling a leveled comparison.

The summary generated by the selected model may be compared to the ground truth summary, at 1310. Comparison may be made using any portion of the summaries. For example, the comparison may be made based on words, sentences, phrases, paragraphs, and/or any other portions contained in the summaries. In some embodiments, the summaries may be compared based on specific content and/or semantic meanings contained in the summaries. One or more metrics may be used to execute such comparisons.

For example, one of the metrics may be indicative of whether the summaries match one another exactly. In some instances, it may be important that selected models perform summarization of electronic documents in the same way as the trained models that generated ground truth summaries. In other instances, a soft matching of summaries may be acceptable, which may result in acceptance of summaries that may lack certain words, sentences, phrases, etc., ordering of words, sentences, phrases, etc. and/or any other elements that may be present in the ground truth summary.

Alternatively, or in addition, one or more scores may be determined based on the comparison of the summaries. The scores may include a recall-oriented understudy for gisting evaluation (ROUGE) score, a bilingual evaluation understudy (BLUE) score, and any combinations thereof. Further, one or more hallucination metrics that indicate whether in the generated summary certain elements (e.g., words, sentences, phrases, entities, etc.) are present from the electronic document that has been provided to the selected ML model.

As can be understood, any of the above metrics may be selected for evaluation of the summary generated by the selected ML model. Metrics may be selected based on specifics of the analysis of the selected ML model that may be requested and/or required.

If at 1312, it is determined that one or more of the above metrics associated with the ground truth summary and the generated summary match and/or satisfy one or more thresholds that may be associated with the metrics, the selected model may be deemed acceptable, at 1314, and thus, may be used for summarization of electronic documents. As can be understood, the acceptable model may be limited to summarization of specific type of documents (e.g., lease agreements) and/or may be used to summarize any type of documents.

Otherwise, if the metrics do not match and/or do not satisfy one or more thresholds associated with the metrics, the selected model may be deemed unacceptable, at 1316. Such selected models may be deemed unacceptable for summarization of specific type of documents (e.g., sales agreements) but may be deemed acceptable for summarization of other type of documents (e.g., lease agreements). As can be understood, acceptability or non-acceptability of any of selected models for summarization purposes may be determined in any other way.

Figure 14A:
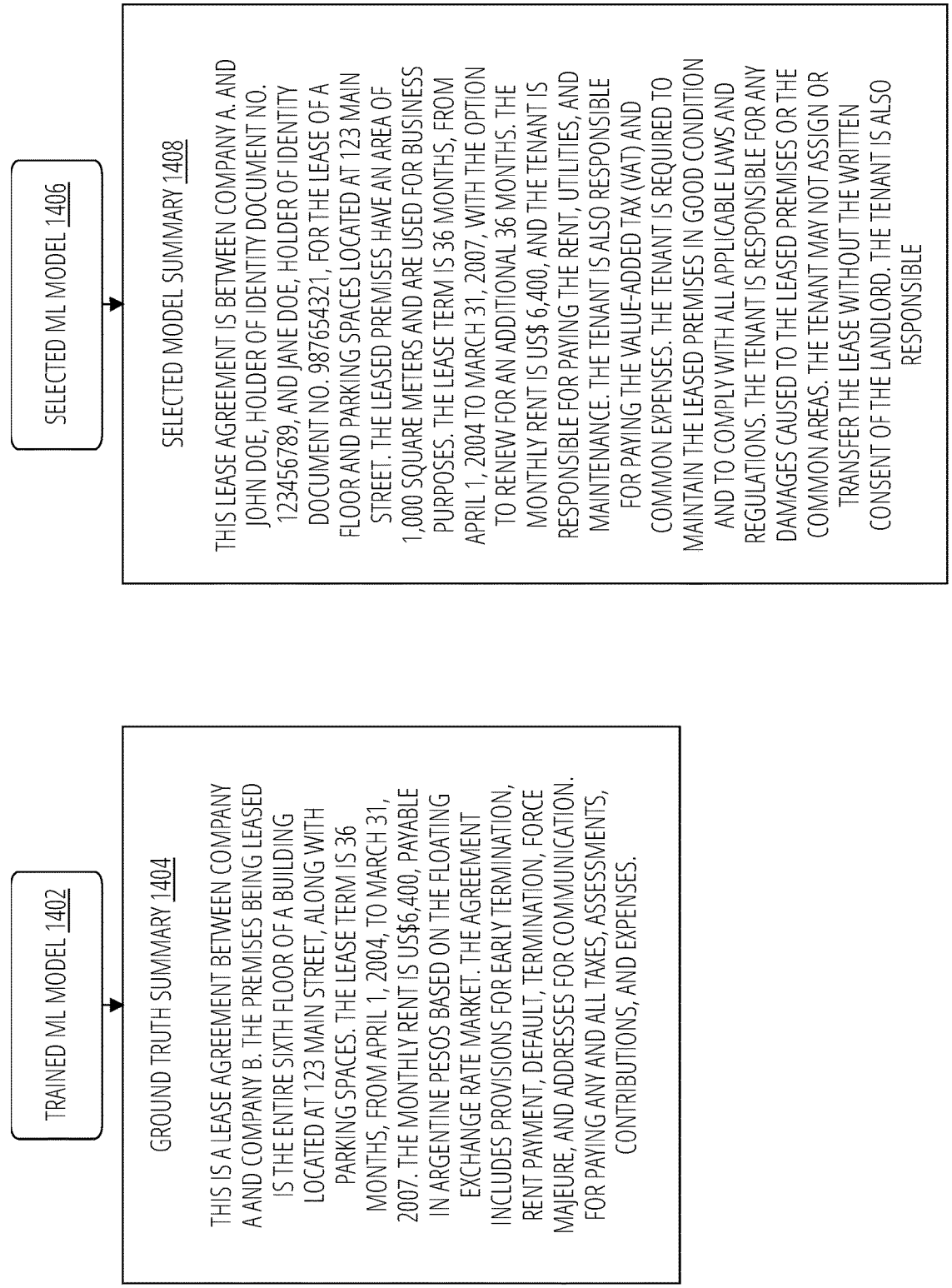
FIG. 14A illustrates an aspect of the subject matter in accordance with one embodiment.
Figure 14B:
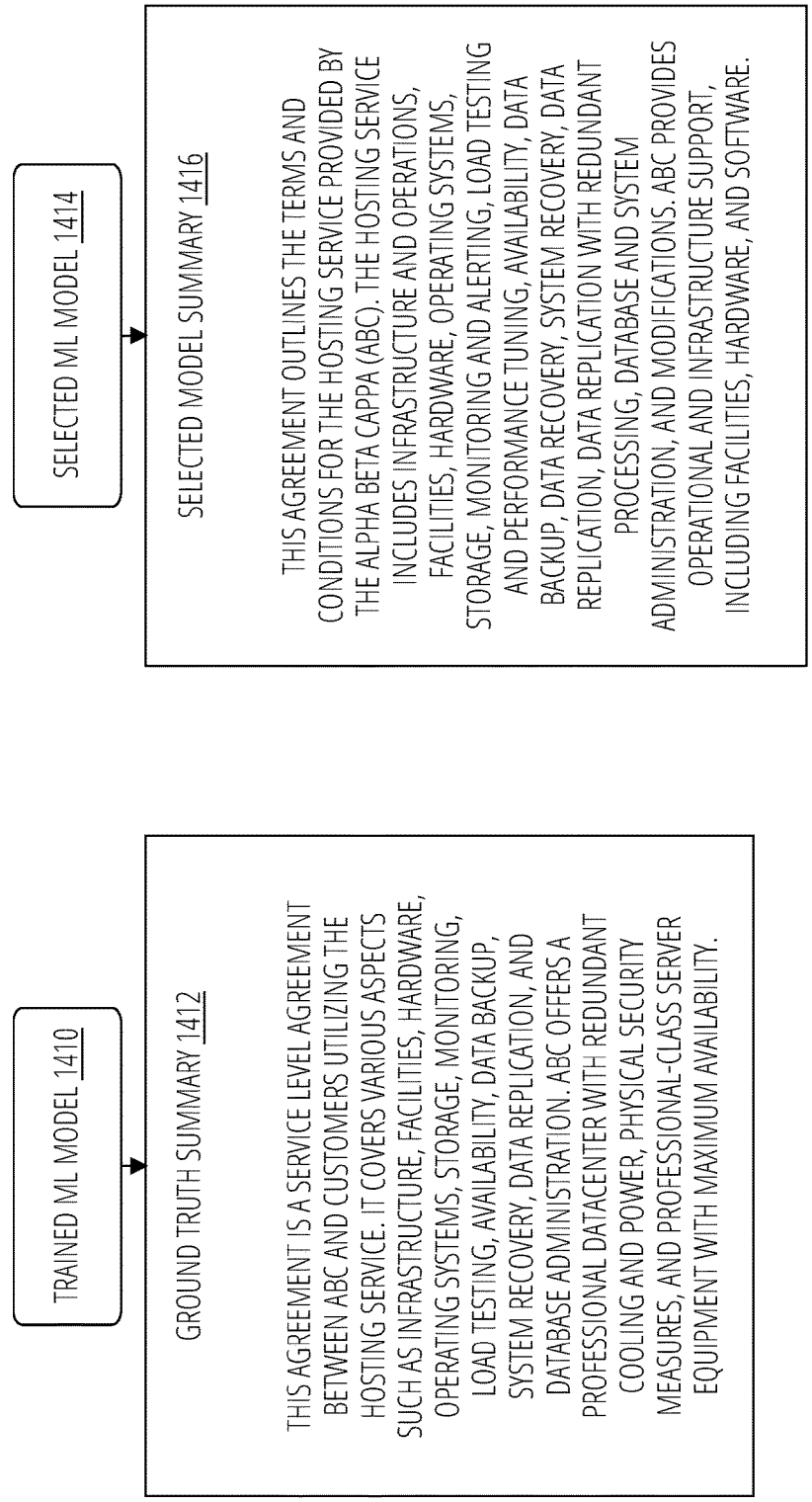
FIG. 14B illustrates an aspect of the subject matter in accordance with one embodiment.

FIGS. 14A-14B illustrate examples of summaries that may be generated as part of an evaluation of machine learning models. As shown in FIG. 14A, a trained ML model 1402 may be configured to generate a ground truth summary 1404 of lease agreement between Company A and Company B. The trained ML model 1402 may be trained using a benchmarking dataset 228. The ground truth summary 1404 may have a specific size (e.g., short summary) and may specify the address of the leased premises (e.g., "123 Main Street"), the dates and duration of the agreement ("from Apr. 1, 2004 to Mar. 31, 2007", "36 months"), amount of rent and how it is to be paid (e.g., "US$6,400, payable in Argentine Pesos"), as well as specify which provisions are included in the agreement.

As shown in FIG. 14A, another model, e.g., selected ML model 1406, may be requested to generate a summary of the same lease agreement, e.g., selected model summary 1408. The summary 1408 may include information about parties to the agreement ("Company A" and "John Doe" and "Jane Doe"), address of the premises ("123 Main Street"), dates and duration of the agreement ("from Apr. 1, 2004 to Mar. 31, 2007", "36 months"), amount of rent (e.g., "US$6,400"), as well as specify which provisions are included in the agreement and include various other responsibilities of the tenant.

There are several differences between the two summaries, such as for example, the names of the parties: the ground truth summary 1404 includes "Company A" and "Company B" as the parties, whereas selected model summary 1408 includes "Company A" and "John Doe" and "Jane" Doe". Information related to how rent is to be paid differs from the ground truth summary 1404 to selected model summary 1408. There are other noticeable differences between the summaries 1404 and 1408.

If exact match metric is used to assess the selected ML model 1406, the selected ML model 1406 is not acceptable because summaries 1404 and 1408 do not match. However, the model 1406 may be acceptable if a soft match metric is used, where exact matches between summaries are not required. Various scores (e.g., ROUGE, BLUE, etc. scores) may be determined based on a comparison of words, sentences, phrases, etc. between summaries 1404 and 1408 and may be used to determine whether model 1408 is acceptable. Each score may have a predetermined threshold associated with it and if such threshold is exceeded as a result of the comparison, then the model may be deemed acceptable. Otherwise, the model might not be acceptable.

FIG. 14B illustrates another example of a comparison between a ground truth summary 1412 generated by a trained ML model 1410 and a selected model summary 1416 generated by a selected ML model 1414. The summaries are of an agreement covering hosting services. The summary 1416 is more detailed, e.g., it includes additional words, sentences, phrases, etc. (e.g., it spells out the company name as "Alpha Beta Cappa") vis-a-vis the ground truth summary (e.g., it provides an abbreviation of the company name as "ABC").

The summaries 1412 and 1416 may be compared using one or more metrics, as discussed herein. The metrics may be indicative of whether summary 1416 is acceptable and hence, the selected ML model 1414 is acceptable for summarization of hosting services agreements.

As can be understood, the comparison of summaries (ground truth summaries and summaries generated by selected ML models) may be performed across the same type of electronic documents (e.g., lease agreements) and/or across different types of electronic documents (e.g., lease agreements and sales agreements). To evaluate summaries, the current subject matter may determine whether or not a particular type of content was captured by the summary generated by the selected ML model.

Figure 15:
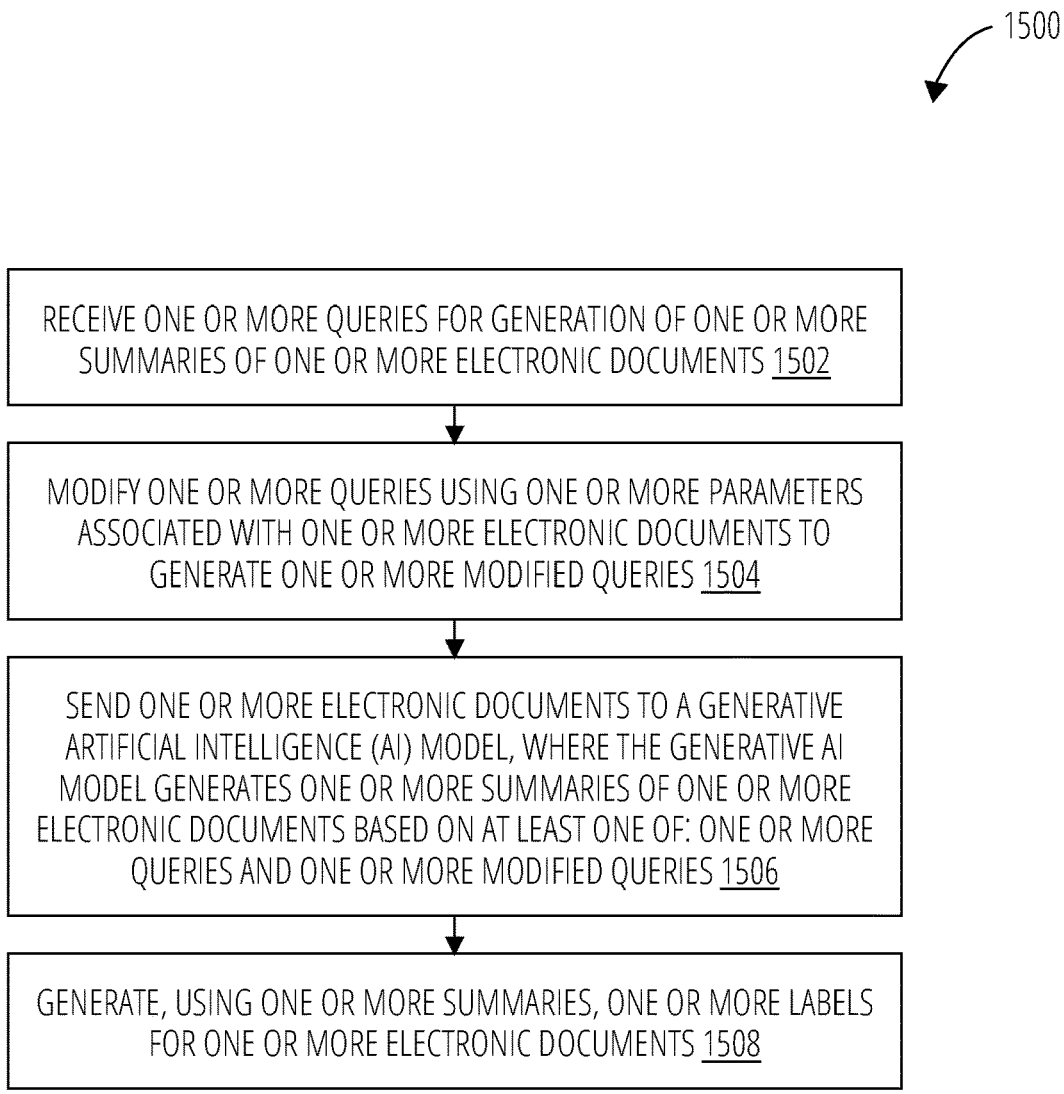
FIG. 15 illustrates an example process for generating a benchmarking dataset (e.g., benchmarking dataset), according to some embodiments of the current subject matter.

FIG. 15 illustrates an example process 1500 for generating a benchmarking dataset (e.g., benchmarking dataset 228), according to some embodiments of the current subject matter. The process 1500 may be executed by the system 100 shown in FIG. 1, and in particular, the benchmarking dataset generation engine 150, as shown in FIG. 2.

At 1502, the benchmarking dataset generation engine 150 may receive one or more queries for generation of one or more summaries of one or more electronic documents. The electronic document may be retrieved from one or more data sources 202, 204, as shown in FIG. 2. The benchmarking dataset generation engine 150 may send the documents to the generative AI model(s) 214. As stated above, the generative AI model(s) 214 may be part of the current subject matter system and/or a third-party generative AI model.

At 1504, the benchmarking dataset generation engine 150 may modify one or more generated queries using one or more parameters associated with one or more electronic documents so as to generate one or more modified queries. The initially generated queries (e.g., requests to generate initial summaries 908) may be used to generate initial summaries 910. The modified queries (e.g., requests to generate modified summaries 912) may be used to generate modified summaries 914 (as shown in FIG. 9).

At 1506, the engine 150 may send one or more electronic documents to a generative artificial intelligence (AI) model (e.g., generative AI model(s) 214). The generative AI model may be configured to generate one or more summaries (e.g., summaries 910, 914) of the electronic documents based on at least one of: one or more queries (e.g., request to generate initial summaries 908) and one or more modified queries (e.g., request to generate modified summaries 912).

At 1508, the benchmarking dataset generation engine 150 may generate, using one or more summaries, one or more labels for the electronic documents (e.g., label(s) 216) for the electronic documents. The labels may be generated using initial summaries 910 and/or modified summaries 914. The labels may be used to form a benchmarking dataset (e.g., benchmarking dataset 228).

Figure 16:
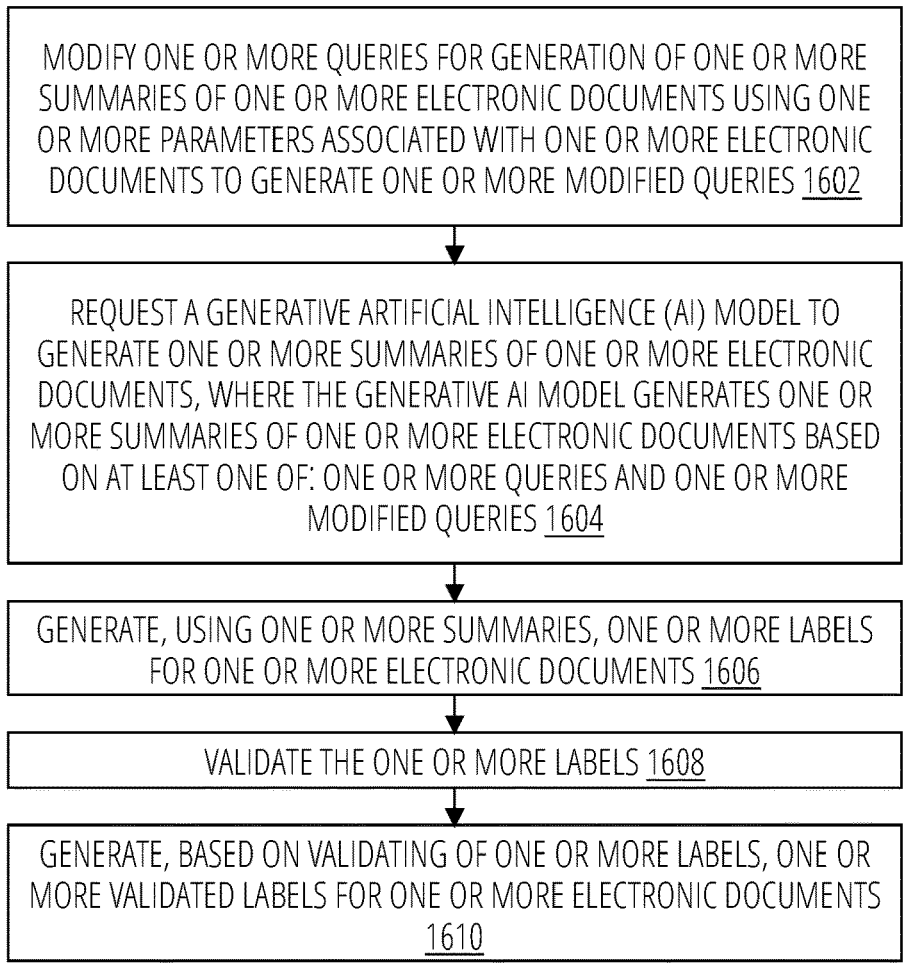
FIG. 16 illustrates another example process for generating a benchmarking dataset, according to some embodiments of the current subject matter.

FIG. 16 illustrates another example process 1600 for generating a benchmarking dataset, according to some embodiments of the current subject matter. The process 1600 may also be executed by the benchmarking dataset generation engine 150 shown in FIG. 2.

At 1602, the benchmarking dataset generation engines 150 may modify one or more queries (e.g., request to generate initial summaries 908) for generation of one or more summaries (e.g., initial summaries 910, modified summaries 914) of one or more electronic documents using one or more parameters (e.g., document parameters 210) associated with electronic documents to generate one or more modified queries (e.g., request to generate modified summaries 912).

At 1604, the engine 150 may request a generative artificial intelligence (AI) model (e.g., generative AI model(s) 214) to generate one or more summaries of the electronic documents. The generative AI model may generate the summaries of the electronic documents based on request to generate initial summaries 908 and/or request to generate modified summaries 912.

At 1606, the benchmarking dataset generation engine 150 may generate one or more labels (e.g., label(s) 216) for the electronic documents.

At 1608, the engine 150 may validate the one or more labels. The validation process may be performed using, for example, feedback engine 218. At 1610, one or more validated labels for one or more electronic documents may be generated. The labels may form a benchmarking dataset.

Figure 17:
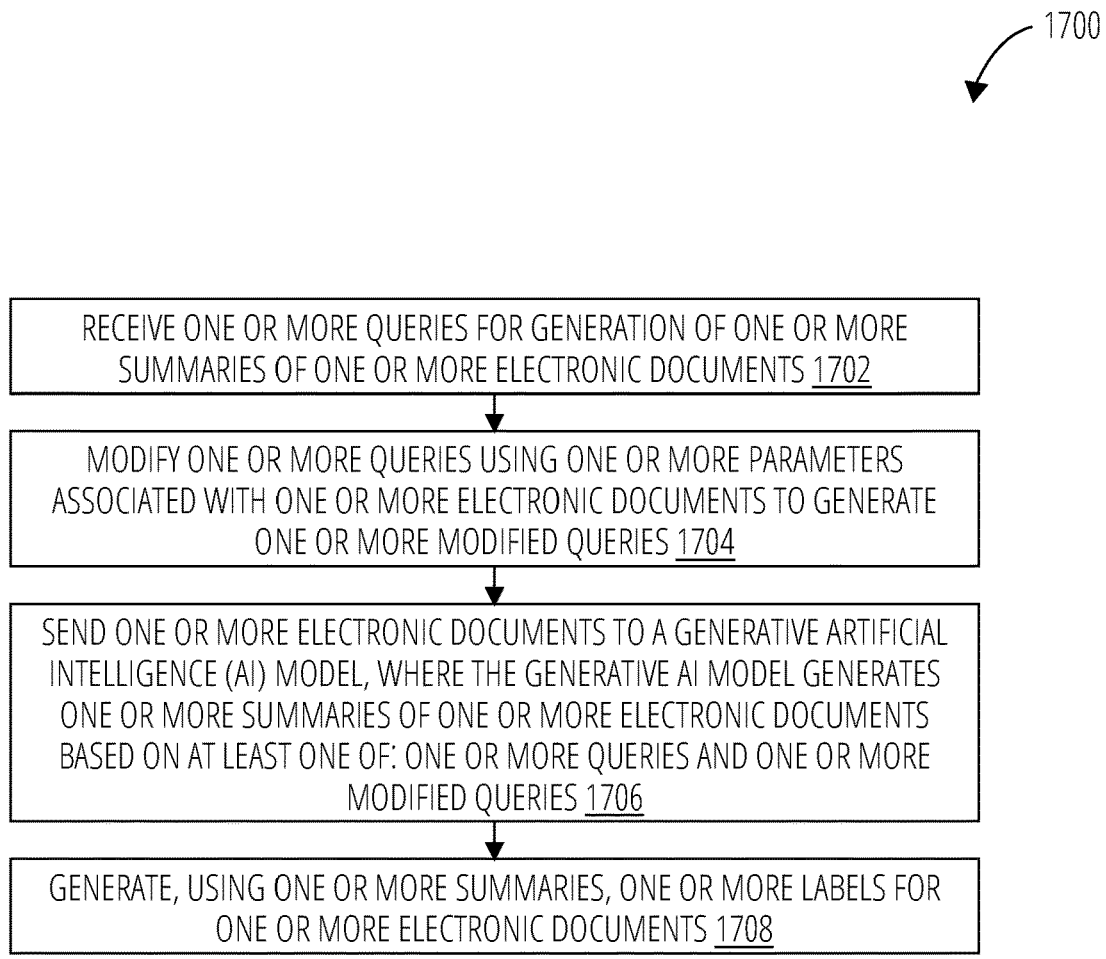
FIG. 17 illustrates yet another example process for generating a benchmarking dataset, according to some embodiments of the current subject matter.

FIG. 17 illustrates yet another example process 1700 for generating a benchmarking dataset, according to some embodiments of the current subject matter. The process 1700 may likewise be executed by the engine 150 as shown in FIG. 2.

At 1702, the benchmarking dataset generation engine 150 may receive one or more queries for generation of one or more summaries of one or more electronic documents. The documents may be obtained from one or more sources 202, 204. The queries may include requests 908.

At 1704, the engine 150 modifies the queries using one or more parameters (e.g., document parameters 210) associated with one or more electronic documents to generate one or more modified queries (e.g., requests 912).

At 1706, the benchmarking dataset generation engine 150 may send one or more electronic documents to a generative artificial intelligence (AI) model (e.g., generative AI model(s) 214) to generate one or more summaries (e.g., summaries 910 and/or 914) of one or more electronic documents based on the requests 908 and/or 912. At 1708, the engine 150 may generate, using one or more summaries, one or more labels (e.g., label(s) 216) for one or more electronic documents.

Figure 18:
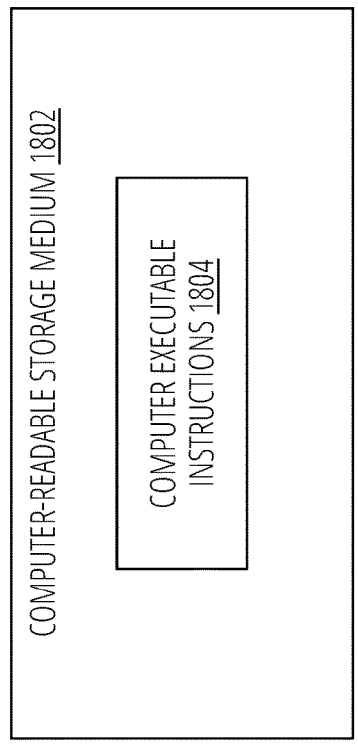
FIG. 18 illustrates a computer-readable storage medium in accordance with one embodiment.

FIG. 18 illustrates an apparatus 1800. Apparatus 1800 may comprise any non-transitory computer-readable storage medium 1802 or machine-readable storage medium, such as an optical, magnetic or semiconductor storage medium. In various embodiments, apparatus 1800 may comprise an article of manufacture or a product. In some embodiments, the computer-readable storage medium 1802 may store computer executable instructions with which circuitry can execute. For example, computer executable instructions 1804 can include instructions to implement operations described with respect to any logic flows described herein. Examples of computer-readable storage medium 1802 or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions 1804 may include any suitable type of code, such as source code, compiled code, interpreted code, executable code, static code, dynamic code, object-oriented code, visual code, and the like.

FIG. 19 illustrates an embodiment of a computing architecture 1900. Computing architecture 1900 is a computer system with multiple processor cores such as a distributed computing system, supercomputer, high-performance computing system, computing cluster, mainframe computer, mini-computer, client-server system, personal computer (PC), workstation, server, portable computer, laptop computer, tablet computer, handheld device such as a personal digital assistant (PDA), or other device for processing, displaying, or transmitting information. Similar embodiments may comprise, e.g., entertainment devices such as a portable music player or a portable video player, a smart phone or other cellular phone, a telephone, a digital video camera, a digital still camera, an external storage device, or the like. Further embodiments implement larger scale server configurations. In other embodiments, the computing architecture 1900 may have a single processor with one core or more than one processor. Note that the term "processor" refers to a processor with a single core or a processor package with multiple processor cores. In at least one embodiment, the computing architecture 1900 is representative of the components of the system 100. More generally, the computing architecture 1900 is configured to implement all logic, systems, logic flows, methods, apparatuses, and functionality described herein with reference to previous figures.

As used in this application, the terms "system" and "component" and "module" are intended to refer to a computer-related entity, either hardware, a combination of hardware and software, software, or software in execution, examples of which are provided by the exemplary computing architecture 1900. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

As shown in FIG. 19, computing architecture 1900 comprises a system-on-chip (SoC) 1902 for mounting platform components. System-on-chip (SoC) 1902 is a point-to-point (P2P) interconnect platform that includes a first processor 1904 and a second processor 1906 coupled via a point-to-point interconnect 1970 such as an Ultra Path Interconnect (UPI). In other embodiments, the computing architecture 1900 may be of another bus architecture, such as a multi-drop bus. Furthermore, each of processor 1904 and processor 1906 may be processor packages with multiple processor cores including core(s) 1908 and core(s) 1910, respectively. While the computing architecture 1900 is an example of a two-socket (2S) platform, other embodiments may include more than two sockets or one socket. For example, some embodiments may include a four-socket (4S) platform or an eight-socket (8S) platform. Each socket is a mount for a processor and may have a socket identifier. Note that the term platform may refers to a motherboard with certain components mounted such as the processor 1904 and chipset 1932. Some platforms may include additional components and some platforms may only include sockets to mount the processors and/or the chipset. Furthermore, some platforms may not have sockets (e.g., SoC, or the like). Although depicted as a SoC 1902, one or more of the components of the SoC 1902 may also be included in a single die package, a multi-chip module (MCM), a multi-die package, a chiplet, a bridge, and/or an interposer. Therefore, embodiments are not limited to a SoC.

The processor 1904 and processor 1906 can be any of various commercially available processors, including without limitation an Intel® Celeron®, Core®, Core (2) Duo®, Itanium®, Pentium®, Xeon®, and XScale® processors; AMD® Athlon®, Duron® and Opteron® processors; ARM® application, embedded and secure processors; IBM® and Motorola® DragonBall® and PowerPC® processors; IBM and Sony® Cell processors; and similar processors. Dual microprocessors, multi-core processors, and other multi-processor architectures may also be employed as the processor 1904 and/or processor 1906. Additionally, the processor 1904 need not be identical to processor 1906.

Processor 1904 includes an integrated memory controller (IMC) 1920 and point-to-point (P2P) interface 1924 and P2P interface 1928. Similarly, the processor 1906 includes an IMC 1922 as well as P2P interface 1926 and P2P interface 1930. IMC 1920 and IMC 1922 couple the processor 1904 and processor 1906, respectively, to respective memories (e.g., memory 1916 and memory 1918). Memory 1916 and memory 1918 may be portions of the main memory (e.g., a dynamic random-access memory (DRAM)) for the platform such as double data rate type 4 (DDR4) or type 5 (DDR5) synchronous DRAM (SDRAM). In the present embodiment, the memory 1916 and the memory 1918 locally attach to the respective processors (i.e., processor 1904 and processor 1906). In other embodiments, the main memory may couple with the processors via a bus and shared memory hub. Processor 1904 includes registers 1912 and processor 1906 includes registers 1914.

Computing architecture 1900 includes chipset 1932 coupled to processor 1904 and processor 1906. Furthermore, chipset 1932 can be coupled to storage device 1950, for example, via an interface (I/F) 1938. The I/F 1938 may be, for example, a Peripheral Component Interconnect-enhanced (PCIe) interface, a Compute Express Link® (CXL) interface, or a Universal Chiplet Interconnect Express (UCIe) interface. Storage device 1950 can store instructions executable by circuitry of computing architecture 1900 (e.g., processor 1904, processor 1906, GPU 1948, accelerator 1954, vision processing unit 1956, or the like). For example, storage device 1950 can store instructions for server device 102, client devices 112, client devices 116, or the like.

Processor 1904 couples to the chipset 1932 via P2P interface 1928 and P2P 1934 while processor 1906 couples to the chipset 1932 via P2P interface 1930 and P2P 1936. Direct media interface (DMI) 1976 and DMI 1978 may couple the P2P interface 1928 and the P2P 1934 and the P2P interface 1930 and P2P 1936, respectively. DMI 1976 and DMI 1978 may be a high-speed interconnect that facilitates, e.g., eight Giga Transfers per second (GT/s) such as DMI 3.0. In other embodiments, the processor 1904 and processor 1906 may interconnect via a bus.

The chipset 1932 may comprise a controller hub such as a platform controller hub (PCH). The chipset 1932 may include a system clock to perform clocking functions and include interfaces for an I/O bus such as a universal serial bus (USB), peripheral component interconnects (PCIs), CXL interconnects, UCIe interconnects, interface serial peripheral interconnects (SPIs), integrated interconnects (I2Cs), and the like, to facilitate connection of peripheral devices on the platform. In other embodiments, the chipset 1932 may comprise more than one controller hub such as a chipset with a memory controller hub, a graphics controller hub, and an input/output (I/O) controller hub.

In the depicted example, chipset 1932 couples with a trusted platform module (TPM) 1944 and UEFI, BIOS, FLASH circuitry 1946 via I/F 1942. The TPM 1944 is a dedicated microcontroller designed to secure hardware by integrating cryptographic keys into devices. The UEFI, BIOS, FLASH circuitry 1946 may provide pre-boot code. The I/F 1942 may also be coupled to a network interface circuit (NIC) 1980 for connections off-chip.

Furthermore, chipset 1932 includes the I/F 1938 to couple chipset 1932 with a high-performance graphics engine, such as, graphics processing circuitry or a graphics processing unit (GPU) 1948. In other embodiments, the computing architecture 1900 may include a flexible display interface (FDI) (not shown) between the processor 1904 and/or the processor 1906 and the chipset 1932. The FDI interconnects a graphics processor core in one or more of processor 1904 and/or processor 1906 with the chipset 1932.

The computing architecture 1900 is operable to communicate with wired and wireless devices or entities via the network interface (NIC) 180 using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, 3G, 4G, LTE wireless technologies, among others. Thus, the communication can be a predefined structure as with a conventional network or simply an ad hoc communication between at least two devices. Wi-Fi networks use radio technologies called IEEE 802.11x (a, b, g, n, ac, ax, etc.) to provide secure, reliable, fast wireless connectivity. A Wi-Fi network can be used to connect computers to each other, to the Internet, and to wired networks (which use IEEE 802.3-related media and functions).

Additionally, accelerator 1954 and/or vision processing unit 1956 can be coupled to chipset 1932 via I/F 1938. The accelerator 1954 is representative of any type of accelerator device (e.g., a data streaming accelerator, cryptographic accelerator, cryptographic co-processor, an offload engine, etc.). One example of an accelerator 1954 is the Intel® Data Streaming Accelerator (DSA). The accelerator 1954 may be a device including circuitry to accelerate copy operations, data encryption, hash value computation, data comparison operations (including comparison of data in memory 1916 and/or memory 1918), and/or data compression. For example, the accelerator 1954 may be a USB device, PCI device, PCIe device, CXL device, UCIe device, and/or an SPI device. The accelerator 1954 can also include circuitry arranged to execute machine learning (ML) related operations (e.g., training, inference, etc.) for ML models. Generally, the accelerator 1954 may be specially designed to perform computationally intensive operations, such as hash value computations, comparison operations, cryptographic operations, and/or compression operations, in a manner that is more efficient than when performed by the processor 1904 or processor 1906. Because the load of the computing architecture 1900 may include hash value computations, comparison operations, cryptographic operations, and/or compression operations, the accelerator 1954 can greatly increase performance of the computing architecture 1900 for these operations.

The accelerator 1954 may include one or more dedicated work queues and one or more shared work queues (each not pictured). Generally, a shared work queue is configured to store descriptors submitted by multiple software entities. The software may be any type of executable code, such as a process, a thread, an application, a virtual machine, a container, a microservice, etc., that share the accelerator 1954. For example, the accelerator 1954 may be shared according to the Single Root I/O virtualization (SR-IOV) architecture and/or the Scalable I/O virtualization (S-IOV) architecture. Embodiments are not limited in these contexts. In some embodiments, software uses an instruction to atomically submit the descriptor to the accelerator 1954 via a non-posted write (e.g., a deferred memory write (DMWr)). One example of an instruction that atomically submits a work descriptor to the shared work queue of the accelerator 1954 is the ENQCMD command or instruction (which may be referred to as "ENQCMD" herein) supported by the Intel® Instruction Set Architecture (ISA). However, any instruction having a descriptor that includes indications of the operation to be performed, a source virtual address for the descriptor, a destination virtual address for a device-specific register of the shared work queue, virtual addresses of parameters, a virtual address of a completion record, and an identifier of an address space of the submitting process is representative of an instruction that atomically submits a work descriptor to the shared work queue of the accelerator 1954. The dedicated work queue may accept job submissions via commands such as the movdir64b instruction.

Various I/O devices 1960 and display 1952 couple to the bus 1972, along with a bus bridge 1958 which couples the bus 1972 to a second bus 1974 and an I/F 1940 that connects the bus 1972 with the chipset 1932. In one embodiment, the second bus 1974 may be a low pin count (LPC) bus. Various devices may couple to the second bus 1974 including, for example, a keyboard 1962, a mouse 1964 and communication devices 1966.

Furthermore, an audio I/O 1968 may couple to second bus 1974. Many of the I/O devices 1960 and communication devices 1966 may reside on the system-on-chip (SoC) 1902 while the keyboard 1962 and the mouse 1964 may be add-on peripherals. In other embodiments, some or all the I/O devices 1960 and communication devices 1966 are add-on peripherals and do not reside on the system-on-chip (SoC) 1902.

FIG. 20 illustrates a block diagram of an exemplary communications architecture 2000 suitable for implementing various embodiments as previously described. The communications architecture 2000 includes various common communications elements, such as a transmitter, receiver, transceiver, radio, network interface, baseband processor, antenna, amplifiers, filters, power supplies, and so forth. The embodiments, however, are not limited to implementation by the communications architecture 2000.

As shown in FIG. 20, the communications architecture 2000 includes one or more clients 2002 and servers 2004. The clients 2002 may implement a client version of the server device 102, for example. The servers 2004 may implement a server version of the server device 102, for example. The clients 2002 and the servers 2004 are operatively connected to one or more respective client data stores 2008 and server data stores 2010 that can be employed to store information local to the respective clients 2002 and servers 2004, such as cookies and/or associated contextual information.

The clients 2002 and the servers 2004 may communicate information between each other using a communication framework 2006. The communications communication framework 2006 may implement any well-known communications techniques and protocols. The communications communication framework 2006 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communication framework 2006 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11 network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 2002 and the servers 2004. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It will be appreciated that the exemplary devices shown in the block diagrams described above may represent one functionally descriptive example of many potential embodiments. Accordingly, division, omission or inclusion of block functions depicted in the accompanying figures does not infer that the hardware components, circuits, software and/or elements for implementing these functions would necessarily be divided, omitted, or included in embodiments.

At least one computer-readable storage medium may include instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose, or it may comprise a general-purpose computer as selectively activated or reconfigured by a computer program stored in the computer. The procedures presented herein are not inherently related to a particular computer or other apparatus. Various general-purpose machines may be used with programs written in accordance with the teachings herein, or it may prove convenient to construct more specialized apparatus to perform the required method steps. The required structure for a variety of these machines will appear from the description given.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The various elements of the devices as previously described with reference to FIGS. 1-19 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores," may be stored on a tangible, machine readable medium and supplied to various customers or manufacturing facilities to load into the fabrication machines that make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

It will be appreciated that the exemplary devices shown in the block diagrams described above may represent one functionally descriptive example of many potential embodiments. Accordingly, division, omission or inclusion of block functions depicted in the accompanying figures does not infer that the hardware components, circuits, software and/or elements for implementing these functions would necessarily be divided, omitted, or included in embodiments.

The following examples pertain to further embodiments, from which numerous permutations and configurations will be apparent.

In one aspect, a method, includes receiving, using at least one processor, one or more queries for generation of one or more summaries of one or more electronic documents; modifying, using the at least one processor, the one or more queries using one or more parameters associated with the one or more electronic documents to generate one or more modified queries; sending, using the at least one processor, the one or more electronic documents to a generative artificial intelligence (AI) model, wherein the generative AI model is configured to generate the one or more summaries of the one or more electronic documents based on at least one of: the one or more queries and the one or more modified queries; and generating, using the at least one processor, using the one or more summaries, one or more labels for the one or more electronic documents.

The method may also include validating the one or more labels; and generating, based on the validating, one or more validated labels for the one or more electronic documents.

The method may also include wherein the validating including analyzing a subject matter of the one or more validated labels.

The method may also include generating one or more rules to analyze the one or more validated labels; analyzing, using the one or more rules, the one or more validated labels; determining at least one validated label in the one or more validated labels complying with the one or more rules, and accepting the at least one validated label for the one or more electronic documents; and determining at least another validated label in the one or more validated labels failing to comply with the one or more rules and preventing use of the at least another validated label for labeling the one or more electronic documents.

The method may also include identifying a machine learning model in a plurality of machine learning models for summarizing the one or more electronic documents; training the machine learning model using the one or more labels; outputting a trained machine learning model; and generating, using the trained machine learning model, a ground truth summary of at least one electronic document in the one or more electronic documents.

The method may also include identifying a first machine learning model in the plurality of machine learning models; generating, using the first machine learning model, a first summary of the at least one electronic document; comparing the first summary to the ground truth summary of the at least one electronic document; and determining, based on the comparing, whether the first machine learning model is acceptable for generating the one or more summaries of the one or more electronic documents.

The method may also include wherein the determining includes generating at least one of: one or more scores ranking the comparing, one or more metrics indicating similarity of the first summary and the ground truth summary, and any combinations thereof.

The method may also include wherein the one or more scores include at least one of the following: a recall-oriented understudy for gisting evaluation (ROUGE) score, a bilingual evaluation understudy score, and any combinations thereof.

The method may also include wherein the similarity is based on at least one of: exact match between the first summary and the ground truth summary, similarities between one or more sentences in the first summary and the ground truth summary, one or more phrases in the first summary and the ground truth summary, one or more words in the first summary and the ground truth summary, one or more alpha-numeric characters in the first summary and the ground truth summary, and any combinations thereof.

The method may also include wherein the plurality of machine learning model includes at least one of the following: a large language model, at least another generative AI model, and any combination thereof.

In one aspect a system may include at least one processor; and at least one non-transitory storage media storing instructions, that when executed by the at least one processor, cause the at least one processor to modify one or more queries for generation of one or more summaries of one or more electronic documents using one or more parameters associated with the one or more electronic documents to generate one or more modified queries; request a generative artificial intelligence (AI) model to generate one or more summaries of the one or more electronic documents, wherein the generative AI model is configured to generate the one or more summaries of the one or more electronic documents based on at least one of: the one or more queries and the one or more modified queries; and generate, using the one or more summaries, one or more labels for the one or more electronic documents; validate the one or more labels; and generate, based on validating of the one or more labels, one or more validated labels for the one or more electronic documents.

The system may also include wherein validation of the one or more labels includes analyzing a subject matter of the one or more validated labels.

The system may also include wherein the at least one processor is configured to generate one or more rules to analyze the one or more validated labels; analyze, using the one or more rules, the one or more validated labels; determine at least one validated label in the one or more validated labels complying with the one or more rules, and accept the at least one validated label for the one or more electronic documents; and determine at least another validated label in the one or more validated labels failing to comply with the one or more rules and prevent use of the at least another validated label for labeling the one or more electronic documents.

The system may also include wherein the at least one processor is configured to identify a machine learning model in a plurality of machine learning models for summarizing the one or more electronic documents; train the machine learning model using the one or more labels; output a trained machine learning model; and generate, using the trained machine learning model, a ground truth summary of at least one electronic document in the one or more electronic documents.

The system may also include wherein the at least one processor is configured to identify a first machine learning model in the plurality of machine learning models; generate, using the first machine learning model, a first summary of the at least one electronic document; compare the first summary to the ground truth summary of the at least one electronic document; and determine, based on comparison, whether the first machine learning model is acceptable for generating the one or more summaries of the one or more electronic documents.

The system may also include wherein the determination includes generating at least one of: one or more scores ranking the comparing, one or more metrics indicating similarity of the first summary and the ground truth summary, and any combinations thereof.

In one aspect, a computer program product comprising a non-transitory machine-readable medium storing instructions that, when executed by at least one programmable processor, cause the at least one programmable processor to: receive one or more queries for generation of one or more summaries of one or more electronic documents; modify the one or more queries using one or more parameters associated with the one or more electronic documents to generate one or more modified queries; send the one or more electronic documents to a generative artificial intelligence (AI) model, wherein the generative AI model is configured to generate the one or more summaries of the one or more electronic documents based on at least one of: the one or more queries and the one or more modified queries; and generate, using the one or more summaries, one or more labels for the one or more electronic documents.

The computer program product may also include wherein the at least one processor is configured to generate one or more rules to analyze the one or more labels; analyze, using the one or more rules, the one or more labels; determine at least one label in the one or more labels complying with the one or more rules, and accept the at least one label for the one or more electronic documents; and determine at least another label in the one or more labels failing to comply with the one or more rules and prevent use of the at least another label for labeling the one or more electronic documents.

The computer program product may also include wherein the at least one processor is configured to identify a machine learning model in a plurality of machine learning models for summarizing the one or more electronic documents; train the machine learning model using the one or more labels; output a trained machine learning model; and generate, using the trained machine learning model, a ground truth summary of at least one electronic document in the one or more electronic documents.

The computer program product may also include identify a first machine learning model in the plurality of machine learning models; generate, using the first machine learning model, a first summary of the at least one electronic document; compare the first summary to the ground truth summary of the at least one electronic document; and determine, based on comparison, whether the first machine learning model is acceptable for generating the one or more summaries of the one or more electronic documents.

Any of the computing apparatus examples given above may also be implemented as means plus function examples. Other technical features may be readily apparent to one skilled in the art from the following figures, descriptions, and claims.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner and may generally include any set of one or more limitations as variously disclosed or otherwise demonstrated herein.

What is claimed is:

1. A computer-implemented method, comprising:
   receiving, using at least one processor, one or more queries for generation of one or more summaries of one or more electronic documents;
   modifying, using the at least one processor, the one or more queries using one or more parameters associated with the one or more electronic documents to generate one or more modified queries;
   sending, using the at least one processor, the one or more electronic documents to a generative artificial intelligence (AI) model, wherein the generative AI model is configured to generate the one or more summaries of the one or more electronic documents based on at least one of: the one or more queries, the one or more modified queries, and any combination thereof;
   generating, using the at least one processor, using the one or more summaries, one or more labels for the one or more electronic documents and forming a benchmarking dataset using the one or more labels; and
   determining, using the at least one processor, using the benchmarking dataset, whether one or more machine learning models in a plurality of machine learning models correctly generated at least one label for at least one electronic document in the one or more electronic documents, wherein the determining includes
      comparing one or more summaries of the one or more electronic documents generated by the one or more machine learning models to one or more ground truth summaries; and
      selecting at least one machine learning model in the one or more machine learning models upon one or more portions of the one or more summaries matching the one or more ground truth summaries for determination whether the at least one machine learning model correctly generated the at least one label for the at least one electronic document.

2. The method of claim 1, further comprising
   validating the one or more labels; and
   generating, based on the validating, one or more validated labels for the one or more electronic documents.

3. The method of claim 2, wherein the validating including analyzing a subject matter of the one or more validated labels.

4. The method of claim 2, further comprising
   generating one or more rules to analyze the one or more validated labels;
   analyzing, using the one or more rules, the one or more validated labels;
   determining at least one validated label in the one or more validated labels complying with the one or more rules, and accepting the at least one validated label for the one or more electronic documents; and
   determining at least another validated label in the one or more validated labels failing to comply with the one or more rules and preventing use of the at least another validated label for labeling the one or more electronic documents.

5. The method of claim 1, further comprising
   identifying a machine learning model in the plurality of machine learning models for summarizing the one or more electronic documents;
   training the machine learning model using the one or more labels;
   outputting a trained machine learning model; and generating, using the trained machine learning model, a ground truth summary of at least one electronic document in the one or more electronic documents.

6. The method of claim 5, further comprising
identifying a first machine learning model in the plurality of machine learning models;
generating, using the first machine learning model, a first summary of the at least one electronic document;
comparing the first summary to the ground truth summary of the at least one electronic document; and
determining, based on the comparing, whether the first machine learning model is acceptable for generating the one or more summaries of the one or more electronic documents.

7. The method of claim 6, wherein the determining includes generating at least one of: one or more scores ranking the comparing, one or more metrics indicating similarity of the first summary and the ground truth summary, and any combinations thereof.

8. The method of claim 7, wherein the one or more scores include at least one of the following: a recall-oriented understudy for gisting evaluation (ROUGE) score, a bilingual evaluation understudy score, and any combinations thereof.

9. The method of claim 7, wherein the similarity is based on at least one of: exact match between the first summary and the ground truth summary, similarities between one or more sentences in the first summary and the ground truth summary, one or more phrases in the first summary and the ground truth summary, one or more words in the first summary and the ground truth summary, one or more alpha-numeric characters in the first summary and the ground truth summary, and any combinations thereof.

10. The method of claim 6, wherein the plurality of machine learning models includes at least one of the following: a large language model, at least another generative AI model, and any combination thereof.

11. A system, comprising:
at least one processor; and
at least one non-transitory storage media storing instructions, that when executed by the at least one processor, cause the at least one processor to
modify one or more queries for generation of one or more summaries of one or more electronic documents using one or more parameters associated with the one or more electronic documents to generate one or more modified queries;
request a generative artificial intelligence (AI) model to generate one or more summaries of the one or more electronic documents, wherein the generative AI model is configured to generate the one or more summaries of the one or more electronic documents based on at least one of: the one or more queries, the one or more modified queries, and any combination thereof;
generate, using the one or more summaries, one or more labels for the one or more electronic documents;
validate the one or more labels;
generate, based on validating of the one or more labels, one or more validated labels for the one or more electronic documents and form a benchmarking dataset using the one or more labels; and
determine, using the benchmarking dataset, whether one or more machine learning models in a plurality of machine learning models correctly generated at least one label for at least one electronic document in the one or more electronic documents, wherein determination whether the one or more machine learning models correctly generated the at least one label includes
comparing one or more summaries of the one or more electronic documents generated by the one or more machine learning models to one or more ground truth summaries; and
selecting at least one machine learning model in the one or more machine learning models upon one or more portions of the one or more summaries matching the one or more ground truth summaries for determination whether the at least one machine learning model correctly generated the at least one label for the at least one electronic document.

12. The system of claim 11, wherein validation of the one or more labels includes analyzing a subject matter of the one or more validated labels.

13. The system of claim 11, wherein the at least one processor is configured to
generate one or more rules to analyze the one or more validated labels;
analyze, using the one or more rules, the one or more validated labels;
determine at least one validated label in the one or more validated labels complying with the one or more rules, and accept the at least one validated label for the one or more electronic documents; and
determine at least another validated label in the one or more validated labels failing to comply with the one or more rules and prevent use of the at least another validated label for labeling the one or more electronic documents.

14. The system of claim 11, wherein the at least one processor is configured to
identify a machine learning model in plurality of machine learning models for summarizing the one or more electronic documents;
train the machine learning model using the one or more labels;
output a trained machine learning model; and
generate, using the trained machine learning model, a ground truth summary of at least one electronic document in the one or more electronic documents.

15. The system of claim 14, wherein the at least one processor is configured to
identify a first machine learning model in the plurality of machine learning models;
generate, using the first machine learning model, a first summary of the at least one electronic document;
compare the first summary to the ground truth summary of the at least one electronic document; and
determine, based on comparison, whether the first machine learning model is acceptable for generating the one or more summaries of the one or more electronic documents.

16. The system of claim 15, wherein the determination whether the first machine learning model is acceptable includes generating at least one of: one or more scores ranking the comparing, one or more metrics indicating similarity of the first summary and the ground truth summary, and any combinations thereof.

17. A computer program product comprising a non-transitory machine-readable medium storing instructions that, when executed by at least one programmable processor, cause the at least one programmable processor to:

receive one or more queries for generation of one or more summaries of one or more electronic documents;

modify the one or more queries using one or more parameters associated with the one or more electronic documents to generate one or more modified queries;

send the one or more electronic documents to a generative artificial intelligence (AI) model, wherein the generative AI model is configured to generate the one or more summaries of the one or more electronic documents based on at least one of: the one or more queries, the one or more modified queries, and any combination thereof, generate, using the one or more summaries, one or more labels for the one or more electronic documents and form a benchmarking dataset using the one or more labels; and determine, using the benchmarking dataset, whether one or more machine learning models in a plurality of machine learning models correctly generated at least one label for at least one electronic document in the one or more electronic documents, wherein determination whether the one or more machine learning models correctly generated the at least one label includes comparing one or more summaries of the one or more electronic documents generated by the one or more machine learning models to one or more ground truth summaries; and selecting at least one machine learning model in the one or more machine learning models upon one or more portions of the one or more summaries matching the one or more ground truth summaries for determination whether the at least one machine learning model correctly generated the at least one label for the at least one electronic document.

18. The computer program product of claim 17, wherein the at least one processor is configured to generate one or more rules to analyze the one or more labels;

analyze, using the one or more rules, the one or more labels;

determine at least one label in the one or more labels complying with the one or more rules, and accept the at least one label for the one or more electronic documents; and determine at least another label in the one or more labels failing to comply with the one or more rules and prevent use of the at least another label for labeling the one or more electronic documents.

19. The computer program product of claim 17, wherein the at least one processor is configured to identify a machine learning model in the plurality of machine learning models for summarizing the one or more electronic documents;

train the machine learning model using the one or more labels;

output a trained machine learning model; and generate, using the trained machine learning model, a ground truth summary of at least one electronic document in the one or more electronic documents.

20. The computer program product of claim 19, wherein the at least one processor is configured to identify a first machine learning model in the plurality of machine learning models;

generate, using the first machine learning model, a first summary of the at least one electronic document;

compare the first summary to the ground truth summary of the at least one electronic document; and determine, based on comparison, whether the first machine learning model is acceptable for generating the one or more summaries of the one or more electronic documents.

* * * * *